US012198408B2

(12) United States Patent
Yamamoto

(10) Patent No.: US 12,198,408 B2
(45) Date of Patent: Jan. 14, 2025

(54) COMPUTER-READABLE RECORDING MEDIUM STORING LEARNING PROGRAM, LEARNING METHOD, AND INFORMATION PROCESSING APPARATUS

(71) Applicant: FUJITSU LIMITED, Kawasaki (JP)

(72) Inventor: Takuma Yamamoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 346 days.

(21) Appl. No.: 17/857,083

(22) Filed: Jul. 4, 2022

(65) Prior Publication Data
US 2023/0130674 A1    Apr. 27, 2023

(30) Foreign Application Priority Data

Oct. 26, 2021 (JP) ................. 2021-174725

(51) Int. Cl.
*G06V 10/774* (2022.01)
*G06T 7/11* (2017.01)
(Continued)

(52) U.S. Cl.
CPC ............. *G06V 10/774* (2022.01); *G06T 7/11* (2017.01); *G06T 7/194* (2017.01); *G06V 20/52* (2022.01); *G06T 2207/20081* (2013.01)

(58) Field of Classification Search
CPC ...... G06V 10/774; G06V 20/52; G06V 10/26; G06V 10/82; G06V 10/40; G06T 7/11;
(Continued)

(56) References Cited

U.S. PATENT DOCUMENTS 10,872,262 B2 * 12/2020 Yano ................... G06V 40/10
2010/0055654 A1    3/2010 Yokono et al.
(Continued)

FOREIGN PATENT DOCUMENTS

JP    2009031939 A *  2/2009
JP    2010-061415 A    3/2010
(Continued)

OTHER PUBLICATIONS

EPOA—Office Action of European Patent Application No. 22181859.4 dated Jan. 3, 2024 [7 pages]. ** Non-Patent Literature documents discussed in EPOA were previously submitted in the IDS filed on Mar. 20, 2023.
(Continued)

*Primary Examiner* — Samir A Ahmed
(74) *Attorney, Agent, or Firm* — Fujitsu Intellectual Property Center

(57) ABSTRACT

A non-transitory computer-readable recording medium stores a program for causing a computer to execute a learning process including: obtaining training data that uses a background image in which an area where an object is to be arranged is imaged and a target image in which the object and the area are imaged as input data and uses information associated with the object not present in the background image but present in the target image as ground truth; and executing machine learning for a machine learning model on a basis of a result output from the machine learning model when the background image and the target image are input to the machine learning model on a basis of the training data and the ground truth.

6 Claims, 23 Drawing Sheets

(51) Int. Cl.
*G06T 7/194* (2017.01)
*G06V 20/52* (2022.01)

(58) Field of Classification Search
CPC . G06T 7/194; G06T 2207/20081; G06T 7/75; G06N 20/00
See application file for complete search history.

(56) References Cited

U.S. PATENT DOCUMENTS

2015/0248586 A1  9/2015  Gaidon et al.
2021/0158100 A1* 5/2021  Kamon .............. G06V 10/7753

FOREIGN PATENT DOCUMENTS

| JP | 2015-167017 A |   | 9/2015 |
|----|---------------|---|--------|
| JP | 2019-153057 A |   | 9/2019 |
| JP | 2020004179 A  | * | 1/2020 |
| JP | 2020-119154 A |   | 8/2020 |

OTHER PUBLICATIONS

Extended European Search Report dated Dec. 19, 2022 for corresponding European Patent Application No. 22181859.4, 10 pages.

Dou, Jianfang et al., "Background subtraction based on deep convolutional neural networks features", Multimedia Tools and Applications, Kluwer Academic Publishers, Boston, US, vol. 78, No. 11, Nov. 12, 2018, pp. 14549-14571, XP036813780, ISSN: 1380-7501, DOI: 10.1007/S11042-018-6854-Z, [retrieved on Nov. 12, 2018].

Bakkay, M. C. et al., "BScGAN: Deep Background Subtraction with Conditional Generative Adversarial Networks", 2018 25th IEEE International Conference on Image Processing (ICIP), IEEE, Oct. 7, 2018, pp. 4018-4022, XP033455172, DOI: 10.1109/ICIP.2018.8451603, [retrieved on Aug. 29, 2018].

Minematsu, Tsubasa et al., "Simple background subtraction constraint for weakly supervised background subtraction network", 2019 16th IEEE International Conference on Advanced Video and Signal Based Surveillance (AVSS), IEEE, Sep. 18, 2019, 8 pages, XP033640697, DOI: 10.1109/AVSS.2019.8909896, [retrieved on Nov. 21, 2019].

Bouwmans, Thierry et al., "Deep neural network concepts for background subtraction: A systematic review and comparative evaluation", Neural Networks, Elsevier Science Publishers, Barking, GB, vol. 117, May 15, 2019, pp. 8-66, XP085751699, ISSN: 0893-6080, DOI: 10.1016/J.NEUNET.2019.04.024, [retrieved on May 15, 2019].

* cited by examiner

FIG. 7

| ITEM NUMBER | INPUT DATA | | GROUND TRUTH (GT) | |
|---|---|---|---|---|
| | BACKGROUND IMAGE DATA FOR LEARNING | TARGET IMAGE DATA FOR LEARNING | GT OF MASK IMAGE | GT OF BBOX |
| 1 | BACKGROUND IMAGE DATA (1) | TARGET IMAGE DATA (1) | MASK IMAGE (1) | BBOX(1) |
| 2 | BACKGROUND IMAGE DATA (2) | TARGET IMAGE DATA (2) | MASK IMAGE (2) | BBOX(2) |
| 3 | BACKGROUND IMAGE DATA (3) | TARGET IMAGE DATA (3) | MASK IMAGE (3) | BBOX(3) |
| ... | ... | ... | ... | ... |

| ITEM NUMBER | INPUT DATA | | GROUND TRUTH (GT) |
|---|---|---|---|
| | BACKGROUND IMAGE DATA FOR LEARNING | TARGET IMAGE DATA FOR LEARNING | GT OF BBOX |
| 1 | BACKGROUND IMAGE DATA (1) | TARGET IMAGE DATA (1) | BBOX(1) |
| 2 | BACKGROUND IMAGE DATA (2) | TARGET IMAGE DATA (2) | BBOX(2) |
| 3 | BACKGROUND IMAGE DATA (3) | TARGET IMAGE DATA (3) | BBOX(3) |
| ... | ... | ... | ... |

241

COMPUTER-READABLE RECORDING MEDIUM STORING LEARNING PROGRAM, LEARNING METHOD, AND INFORMATION PROCESSING APPARATUS

CROSS-REFERENCE TO RELATED APPLICATION

This application is based upon and claims the benefit of priority of the prior Japanese Patent Application No. 2021-174725, filed on Oct. 26, 2021, the entire contents of which are incorporated herein by reference.

FIELD

The embodiments discussed herein are related to a learning program and the like.

BACKGROUND

Self-checkout machines have been widespread in stores such as supermarkets, convenience stores, and the like. The self-checkout machines are point-of-sale (POS) checkout systems in which users themselves who purchase products read barcodes of the products and make payment. For example, with the self-checkout machines introduced, it becomes possible to reduce labor cost and to suppress incorrect payment caused by errors made by store clerks.

Japanese Laid-open Patent Publication No. 2019-153057 is disclosed as related art.

SUMMARY

According to an aspect of the embodiments, a non-transitory computer-readable recording medium stores a program for causing a computer to execute a learning process including: obtaining training data that uses a background image in which an area where an object is to be arranged is imaged and a target image in which the object and the area are imaged as input data and uses information associated with the object not present in the background image but present in the target image as ground truth; and executing machine learning for a machine learning model on a basis of a result output from the machine learning model when the background image and the target image are input to the machine learning model on a basis of the training data and the ground truth.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating an exemplary data structure of training data according to the first embodiment;

FIG. 14 is a diagram illustrating an exemplary data structure of training data according to the second embodiment;

DESCRIPTION OF EMBODIMENTS

Meanwhile, fraud by the users, such as not reading the barcodes, needs to be detected in the self-checkout machines.

Figure 21:
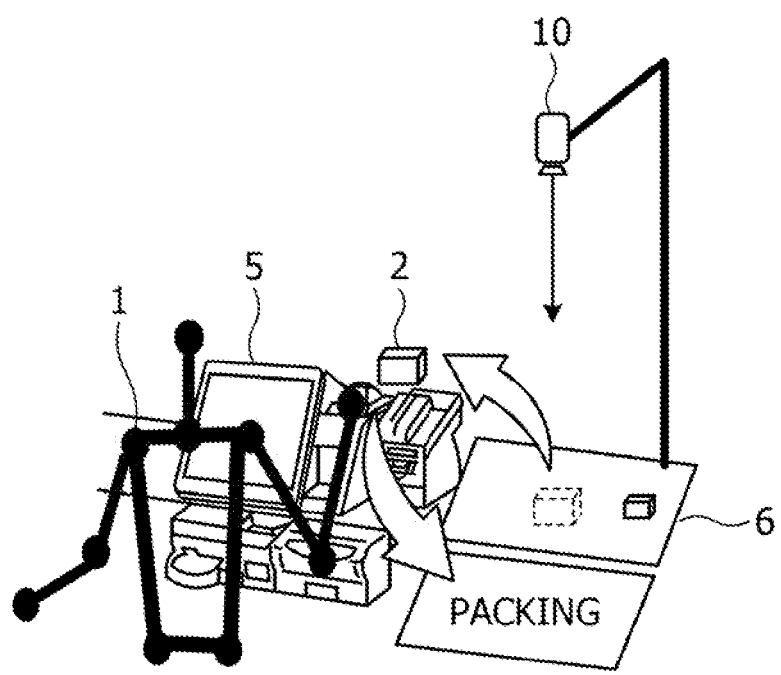
FIG. 21 is a diagram for explaining an existing technique.

FIG. 21 is a diagram for explaining an existing technique. In the example illustrated in FIG. 21, it is assumed that a user 1 picks up a product 2 placed on a temporary table 6, performs an operation of scanning the barcode of the product 2 on a self-checkout machine 5, and do packing. According to the existing technique, image data of a camera 10 is analyzed, the product placed on the temporary table 6 is subject to object detection, and the number of products is specified. Fraud may be detected by checking whether or not the specified number of products matches the number of actually scanned products. In the existing technique, a technique such as deep learning (hereinafter referred to as DL) or the like is used when performing the object detection as described with reference to FIG. 21.

In a case of performing the object detection using DL, large-volume labeled data is manually prepared, and the machine learning is executed for an object detection model for performing the object detection using the labeled data. Here, since the object detection model detects only objects learned in advance, it is not realistic to prepare labeled data to repeat machine learning of the object detection model again under the conditions that product types are enormous and the products are replaced daily as in the stores mentioned above.

Figure 22:
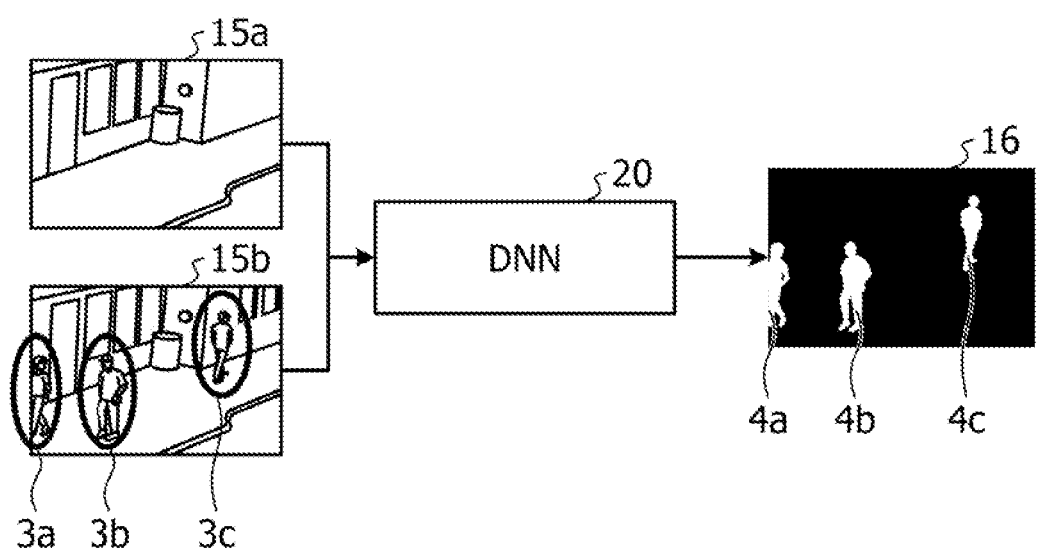
FIG. 22 is a diagram for explaining an existing technique for specifying an area of an unknown object.

Note that there is an existing technique capable of specifying an area of an object even if the object is an unknown object that has not been learned in advance. FIG. 22 is a diagram for explaining the existing technique for specifying an area of an unknown object. According to the existing technique described with reference to FIG. 22, a deep neural network (DNN) 20 that outputs a mask image 16 indicating an area different from the background from a background image 15a and a target image 15b is obtained by machine learning using a large number of various images.

While the capture area of the background image 15a and the capture area of the target image 15b are the same capture areas, the background image 15a does not include objects 3a, 3b, and 3c present in the target image 15b. The mask image 16 indicates areas 4a, 4b, and 4c corresponding to the objects 3a, 3b, and 3c. For example, "1" is set for the pixels in the areas 4a, 4b, and 4c of the mask image 16, and "0" is set for the pixels in other areas.

According to the existing technique of FIG. 22, an area different from the background is specified, whereby, even for an unknown object, the area thereof may be specified. Accordingly, it is conceivable to specify an area of an unknown product to specify the number of products by applying the existing technique of FIG. 22 to the existing technique of FIG. 21.

However, the existing technique described above has a problem that an object not present in the background image but present in the target image may not be detected.

The existing technique described with reference to FIG. 22 is a technique of specifying the entire region different from the background, and does not specify the position, size, and the like of individual objects. Accordingly, when multiple objects are close to each other, they become one connected area.

Figure 23:
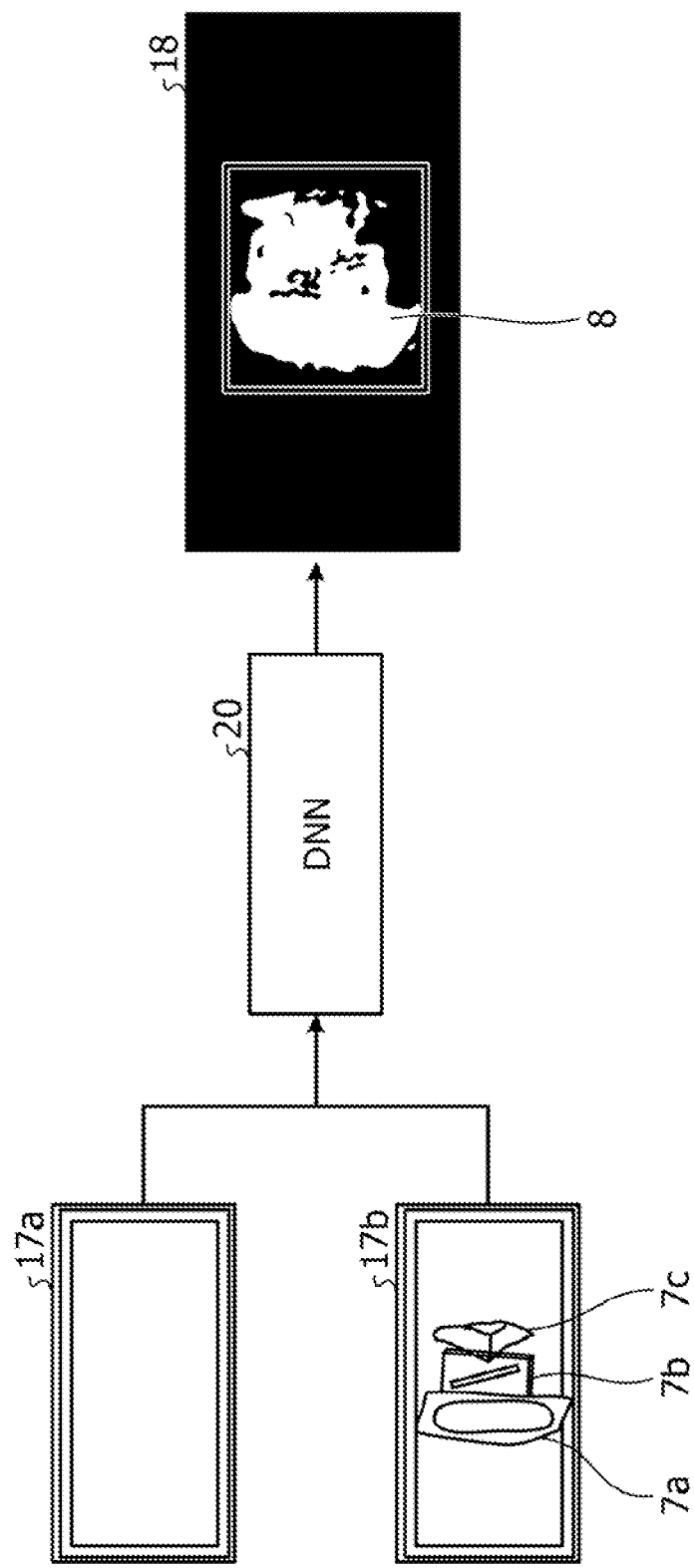
FIG. 23 is a diagram for explaining a problem of the existing technique.

FIG. 23 is a diagram for explaining a problem of the existing technique. In the example illustrated in FIG. 23, when a background image 17a and a target image 17b are input to the DNN 20 having been subject to machine learning, a mask image 18 is output. The target image 17b includes products 7a, 7b, and 7c. Since the products 7a to 7c in the target image 17b are close to each other, one connected area area 8 is indicated in the mask image 18. It is difficult to specify the areas corresponding to the products 7a, 7b, and 7c, and to specify the number of products "3" on the basis of the area 8 in the mask image 18.

In one aspect, it is an object of the embodiments to provide a learning program, a learning method, and an information processing apparatus capable of providing a model capable of detecting an object not present in a background image but present in a target image.

Hereinafter, embodiments of a learning program, a learning method, and an information processing apparatus disclosed in the present application will be described in detail with reference to the drawings. Note that the embodiments do not limit the present disclosure.

First Embodiment

Figure 1:
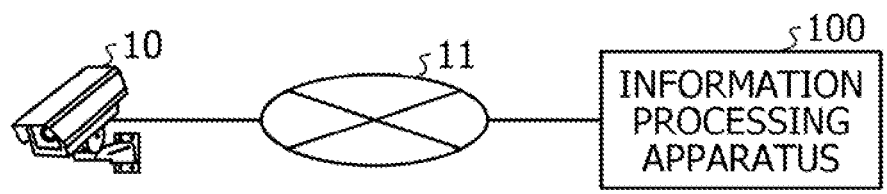
FIG. 1 is a diagram illustrating a system according to a first embodiment.

Next, an exemplary system according to a first embodiment will be described. FIG. 1 is a diagram illustrating a system according to the first embodiment. As illustrated in FIG. 1, this system includes a camera 10 and an information processing apparatus 100. The camera 10 and the information processing apparatus 100 are mutually connected via a network 11. The camera 10 and the information processing apparatus 100 may be directly connected by wire or wirelessly.

The camera 10 may be a camera that images the inside or outside of a store, or may be a camera that images the temporary table 6 on which products are placed illustrated in FIG. 21. The camera 10 transmits image data in an imaging range to the information processing apparatus 100.

In the following descriptions, image data captured by the camera 10 that does not include an object to be detected will be referred to as "background image data". For example, the background image data corresponds to the background image 15a described with reference to FIG. 22. Image data captured by the camera 10 that includes an object to be detected will be referred to as "target image data". For example, the target image data corresponds to the target image 15b described with reference to FIG. 22. The target image 15b includes objects 3a to 3c. While the capture area of the background image 15a is the same as the capture area of the target image 15b, the background image 15a does not include the objects 3a to 3c.

The information processing apparatus 100 is a device that infers an area of an individual object included in the target image data on the basis of the background image data and the target image data. The information processing apparatus 100 receives the background image data from the camera 10 in advance before starting inference, and sequentially receives the target image data from the camera 10 when starting the inference.

Hereinafter, a basic part of processing of the information processing apparatus 100 and first and second characteristic processes to be added to such basic part of the processing will be described in order.

Figure 2:
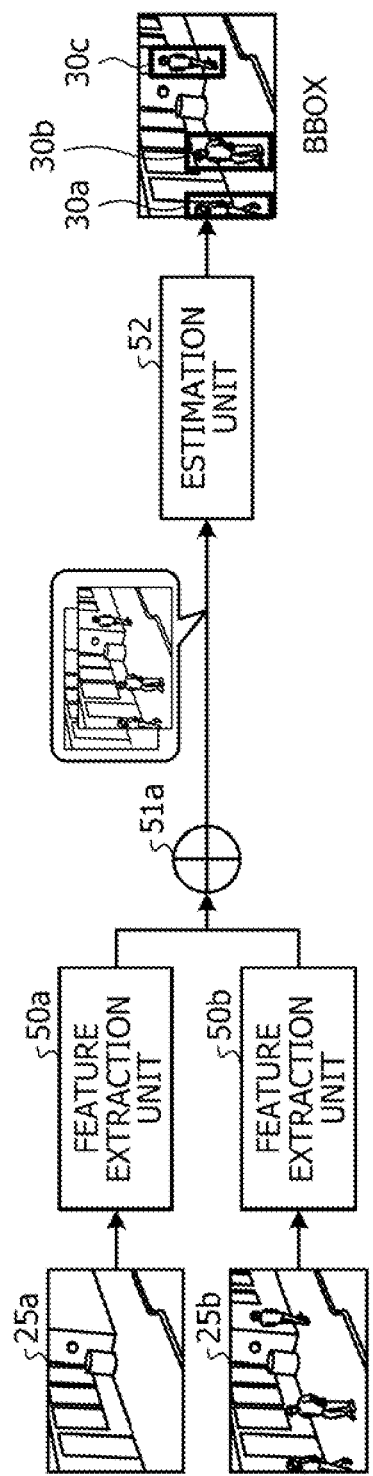
FIG. 2 is a diagram for explaining a basic part of processing of an information processing apparatus according to the first embodiment.

FIG. 2 is a diagram for explaining the basic part of the processing of the information processing apparatus according to the first embodiment. As illustrated in FIG. 2, the information processing apparatus 100 that executes the processing of the basic part includes feature extraction units 50a and 50b, a combining unit 51a, and an estimation unit 52.

The feature extraction units 50a and 50b correspond to a commonly used convolutional neural network (CNN). When background image data 25a is input, the feature extraction unit 50a outputs an image feature to the combining unit 51a on the basis of parameters trained by machine learning. When target image data 25b is input, the feature extraction unit 50b outputs an image feature to the combining unit 51a on the basis of parameters trained by machine learning.

The image features output from the feature extraction units 50a and 50b are assumed to be values before being converted into probability values based on a softmax function or the like. In the following descriptions, the image feature of the background image data 25a will be referred to as a "background image feature". The image feature of the target image data 25b will be referred to as a "target image feature". The background image feature and the target image feature correspond to an intermediate feature.

The same parameters are set in the feature extraction units 50a and 50b. Although the feature extraction units 50a and 50b are separately illustrated in FIG. 2 for convenience of explanation, the feature extraction units 50a and 50b are assumed to be the same CNN.

The combining unit 51a combines the background image feature and the target image feature, and outputs the combined feature to the estimation unit 52.

The estimation unit 52 corresponds to a commonly used convolutional neural network (CNN). When the feature obtained by combining the background image feature and the target image feature is input, the estimation unit 52 specifies a bbox of each object on the basis of the parameters trained by machine learning. For example, the bounding box (bbox) indicates area information surrounding an object, and has position and size information. In the example illustrated in FIG. 2, three pieces of bbox 30a, 30b, and 30c are specified.

Figure 3:
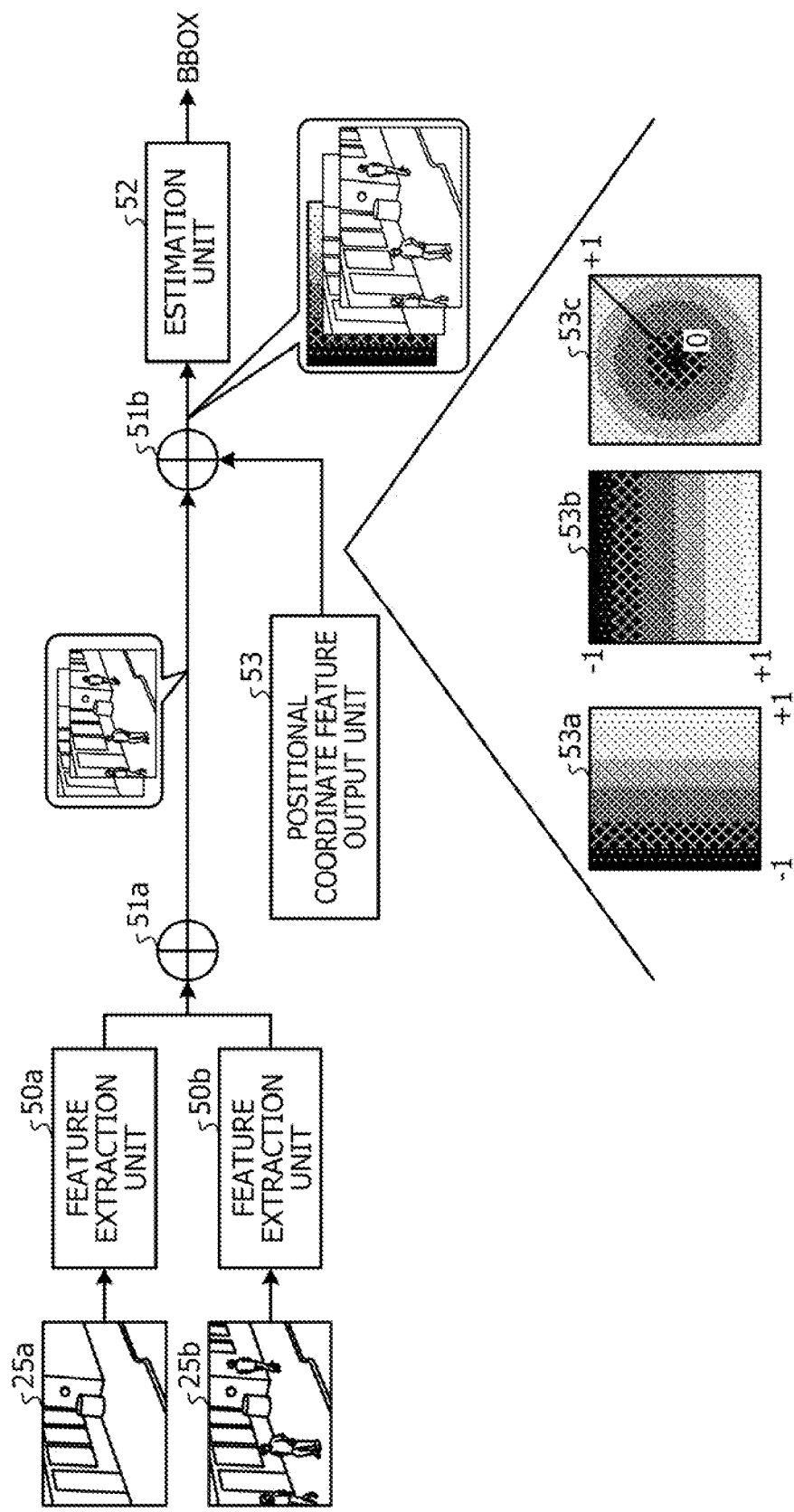
FIG. 3 is a diagram for explaining a first characteristic process.

Next, the "first characteristic process" to be added to the basic part of the processing of the information processing apparatus 100 illustrated in FIG. 2 will be described. FIG. 3 is a diagram for explaining the first characteristic process. In FIG. 3, a positional coordinate feature output unit 53 and a combining unit 51b are included in addition to the feature extraction units 50a and 50b, the combining unit 51a, and the estimation unit 52 described with reference to FIG. 2.

Descriptions regarding the feature extraction units 50a and 50b are similar to the descriptions regarding the feature extraction units 50a and 50b described with reference to FIG. 2.

The combining unit 51a combines the background image feature and the target image feature, and outputs the combined feature to the combining unit 51b.

The positional coordinate feature output unit 53 outputs a plurality of coordinate features in which coordinate values are arranged in an image plane. For example, as illustrated in FIG. 3, the positional coordinate feature output unit 53 outputs, to the combining unit 51b, an x-coordinate feature 53a, a y-coordinate feature 53b, and a distance feature 53c.

Coordinate values from "−1" to "+1" are set in ascending order in the row direction from left to right for each pixel of the x-coordinate feature 53a. The same coordinate value is set for each pixel in the column direction. For example, "−1" is set for each pixel in the leftmost column of the x-coordinate feature 53a.

Coordinate values from "−1" to "+1" are set in ascending order in the column direction from top to bottom for each pixel of the y-coordinate feature 53b. The same coordinate value is set for each pixel in the row direction. For example, "−1" is set for each pixel in the top row of the y-coordinate feature 53b.

For the distance feature 53c, coordinate values from "0" to "+1" are set in ascending order from the central pixel toward the outside. For example, "0" is set for the central pixel of the distance feature 53c.

The combining unit 51b outputs, to the estimation unit 52, information obtained by combining the background image feature, the target image feature, the x-coordinate feature 53a, the y-coordinate feature 53b, and the distance feature 53c.

When the information obtained by combining the background image feature, the target image feature, the x-coordinate feature 53a, the y-coordinate feature 53b, and the distance feature 53c is input, the estimation unit 52 specifies the bbox of each object on the basis of the parameters trained by machine learning.

Figure 4:
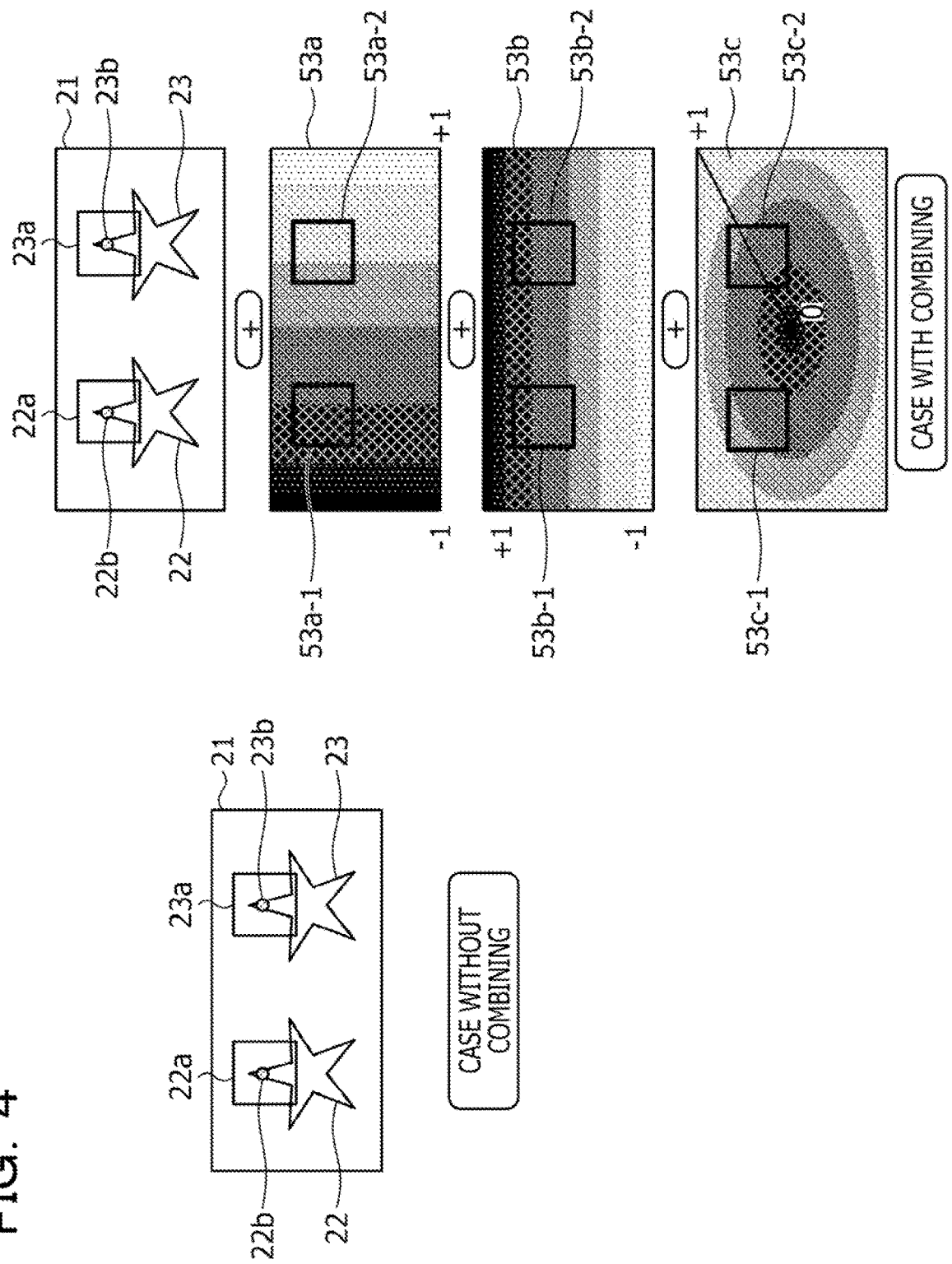
FIG. 4 is a diagram for providing a supplementary explanation of the first characteristic process.

FIG. 4 is a diagram for providing a supplementary explanation of the first characteristic process. For example, a case of performing convolution using a neural network on an image 21 illustrated in FIG. 4 will be assumed. In a normal convolution process, it is difficult to discriminate objects having the same appearance as separate objects as the position does not change. For example, objects 22 and 23 contained in the image 21 have the same appearance. Accordingly, a result 22b obtained by performing the convolution process on an area 22a is the same as a result 23b obtained by performing the convolution process on an area 23a.

Meanwhile, according to the first characteristic process described with reference to FIG. 3, the convolution is performed on the information obtained by combining the x-coordinate feature 53a, the y-coordinate feature 53b, and the distance feature 53c with the image feature. For example, in a case of performing convolution on the area 22a, an area 53a-1, an area 53b-1, and an area 53c-1 are also convolved. Similarly, in a case of performing convolution on the area 23a, an area 53a-2, an area 53b-2, and an area 53c-2 are also convolved. As a result, the result 22b obtained by performing the convolution process on the area 22a is not the same as the result 23b obtained by performing the convolution process on the area 23a, whereby it becomes possible to discriminate the objects 22 and 23.

Figure 5:
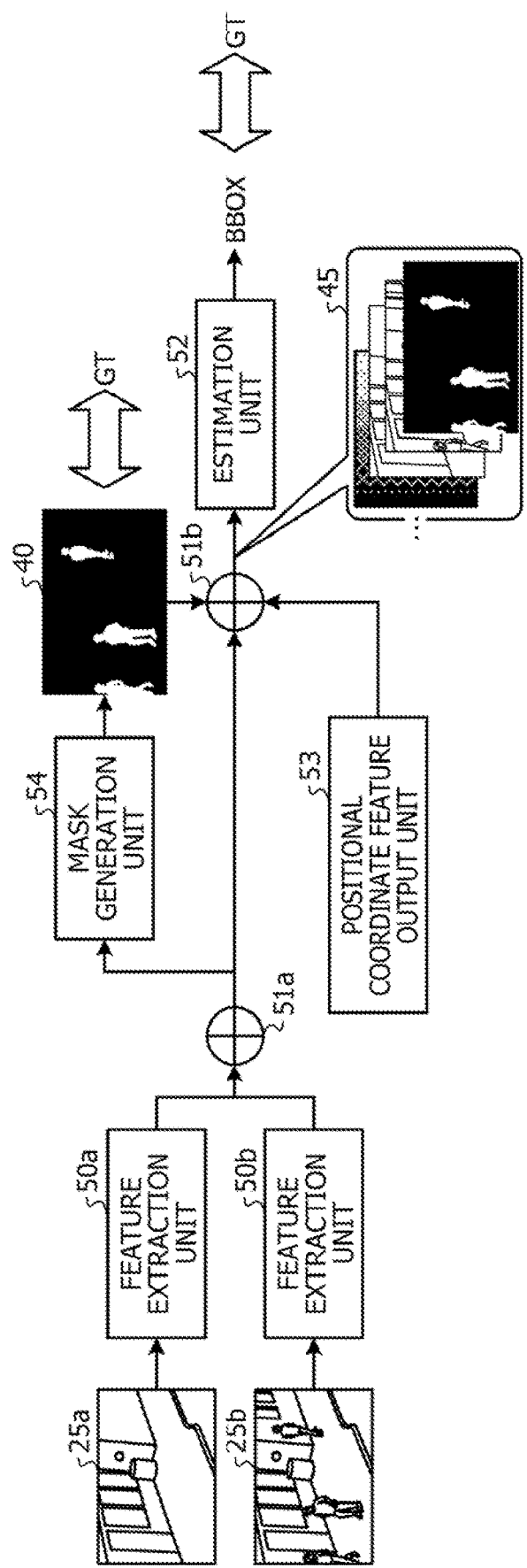
FIG. 5 is a diagram for providing a supplementary explanation of a second characteristic process.

Next, the "second characteristic process" to be added to the basic part of the processing of the information processing apparatus 100 illustrated in FIG. 2 will be described. FIG. 5 is a diagram for explaining the second characteristic process. In FIG. 5, a mask generation unit 54 is included in addition to the feature extraction units 50a and 50b, the combining units 51a and 51b, the estimation unit 52, and the positional coordinate feature output unit 53 described with reference to FIG. 3.

Descriptions regarding the feature extraction units 50a and 50b and the positional coordinate feature output unit 53 are similar to the descriptions given with reference to FIGS. 2 and 3.

The combining unit 51a combines the background image feature and the target image feature, and outputs the combined feature to the combining unit 51b and to the mask generation unit 54.

The mask generation unit 54 corresponds to a commonly used convolutional neural network (CNN). When the feature obtained by combining the background image feature and the target image feature is input, the mask generation unit 54 generates a mask image 40 on the basis of the parameters trained by machine learning. The mask image 40 is information indicating an area of an object not present in the background image data 25a but present in the target image data 25b. For example, the mask image 40 is a bitmap, and "1" is set for pixels corresponding to object areas while "0" is set for pixels corresponding to other areas.

The combining unit 51b outputs, to the estimation unit 52, combined information 45 obtained by combining the background image feature, the target image feature, the x-coordinate feature 53a, the y-coordinate feature 53b, the distance feature 53c, and the mask image 40.

When the combined information 45 is input, the estimation unit 52 specifies the bbox of each object on the basis of the parameters trained by machine learning. For example, the combined information 45 is information in which the background image feature, the target image feature, the x-coordinate feature 53a, the y-coordinate feature 53b, the distance feature 53c, and the mask image 40 overlap. The estimation unit 52 arranges a kernel in which parameters are set in the combined information 45 in which individual pieces of information overlap, and perform convolution while moving the position of the kernel.

Here, a supplementary explanation will be given regarding the second characteristic process. For example, assuming machine learning in a case of not using the mask generation unit 54, the machine learning is carried out using training data that uses background image data for learning and target image data for learning as input data and uses the bbox of the object contained in the target image data for learning as ground truth (GT).

When such machine learning is carried out, characteristics of individual objects contained in the target image data may be memorized, and the bbox of the object may be estimated only from the target image data without using the background image data. For example, the object contained in the target image data for learning is directly memorized so that it is not possible to deal with an unknown object, which may be said to be overfitting (overtraining).

In order to suppress the overfitting described above, a task that may not be solved without using the background image data is subject to the machine learning as an auxiliary task, thereby causing the neural network (NN) to utilize the background image. For example, a process of machine learning of the mask generation unit 54 illustrated in FIG. 5 is an auxiliary task. For example, the bbox estimation described above is a main task, and the task of generating a mask image is an auxiliary task.

Furthermore, the mask image 40 generated by the mask generation unit 54 is further input to the estimation unit 52 to execute machine learning of estimating the bbox of the object. As a result, an effect of limiting the object to be detected to the object area in the mask image may be expected.

In FIG. 5, the information processing apparatus 100 inputs input data to the feature extraction units 50a and 50b, and trains the parameters of the feature extraction units 50a and 50b, the estimation unit 52, and the mask generation unit 54 in such a manner that an error between the bbox output from the estimation unit 52 and the ground truth (ground truth value of bbox) and an error between the mask image output from the mask generation unit 54 and the ground truth (ground truth value of mask image) are made smaller.

Figure 6:
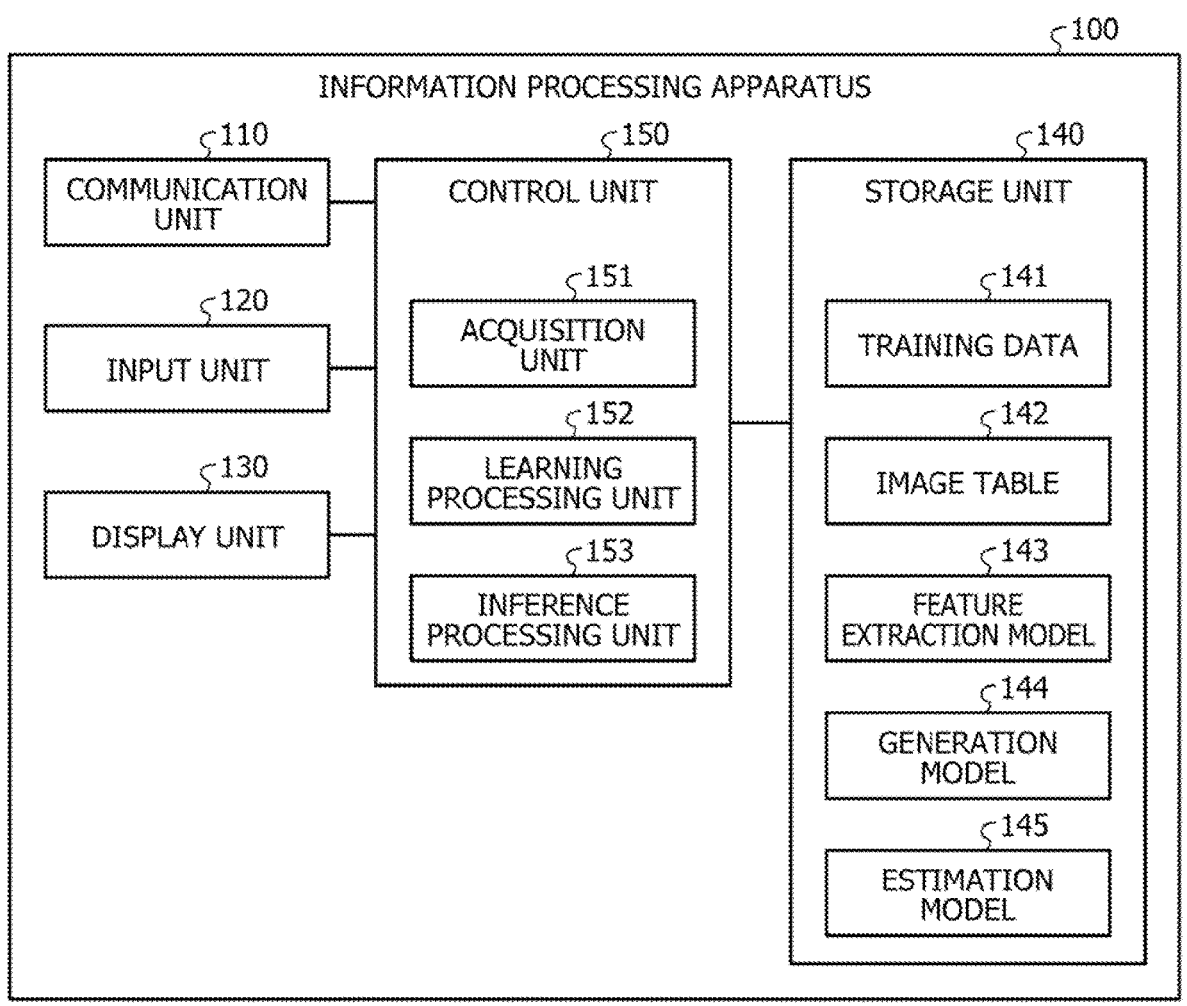
FIG. 6 is a functional block diagram illustrating a configuration of the information processing apparatus according to the first embodiment.

Next, an exemplary configuration of the information processing apparatus 100 that executes the processes described with reference to FIGS. 2 to 4 will be described. FIG. 6 is a functional block diagram illustrating a configuration of the information processing apparatus according to the first embodiment. As illustrated in FIG. 6, the information processing apparatus 100 includes a communication unit 110, an input unit 120, a display unit 130, a storage unit 140, and a control unit 150.

The communication unit 110 executes data communication with the camera 10 and an external device (not illustrated). For example, the communication unit 110 receives image data (background image data and target image data) from the camera 10. The communication unit 110 receives training data 141 to be used for machine learning and the like from the external device.

The input unit 120 corresponds to an input device for inputting various types of information to the information processing apparatus 100.

The display unit 130 displays an output result from the control unit 150.

The storage unit 140 has the training data 141, an image table 142, a feature extraction model 143, a generation model 144, and an estimation model 145. The storage unit 140 corresponds to a semiconductor memory element such as a random access memory (RAM), a flash memory, or the like, or a storage device such as a hard disk drive (HDD) or the like.

The training data 141 is data to be used at a time of executing machine learning. FIG. 7 is a diagram illustrating an exemplary data structure of the training data according to the first embodiment. As illustrated in FIG. 7, the training data 141 retains an item number, input data, and ground truth (GT) in association with each other. The input data includes the background image data for learning and the target image data for learning. The ground truth includes GT of the mask image and GT of the bbox (coordinates of object area).

The image table 142 is a table that retains the background image data and the target image data to be used at a time of inference.

The feature extraction model 143 is a machine learning model (CNN) to be executed by the feature extraction units 50a and 50b. When image data is input to the feature extraction model 143, an image feature is output.

The generation model 144 is a machine learning model (CNN) to be executed by the mask generation unit 54. When information obtained by combining the background image feature and the target image feature is input to the generation model 144, a mask image is output.

The estimation model 145 is a machine learning model (CNN) to be executed by the estimation unit 52. When the combined information 45 is input to the estimation model 145, the bbox is output.

The control unit 150 includes an acquisition unit 151, a learning processing unit 152, and an inference processing unit 153. The control unit 150 corresponds to a central processing unit (CPU) or the like.

In a case where the acquisition unit 151 obtains the training data 141 from an external device or the like, it registers the obtained training data 141 in the storage unit 140.

The acquisition unit 151 obtains the background image data from the camera 10 in advance, and registers it in the image table 142. The acquisition unit 151 obtains the target image data from the camera 10, and registers it in the image table 142.

The learning processing unit 152 executes machine learning of the feature extraction units 50a and 50b (feature extraction model 143), the mask generation unit 54 (generation model 144), and the estimation unit 52 (estimation model 145) on the basis of the training data 141.

Figure 8:
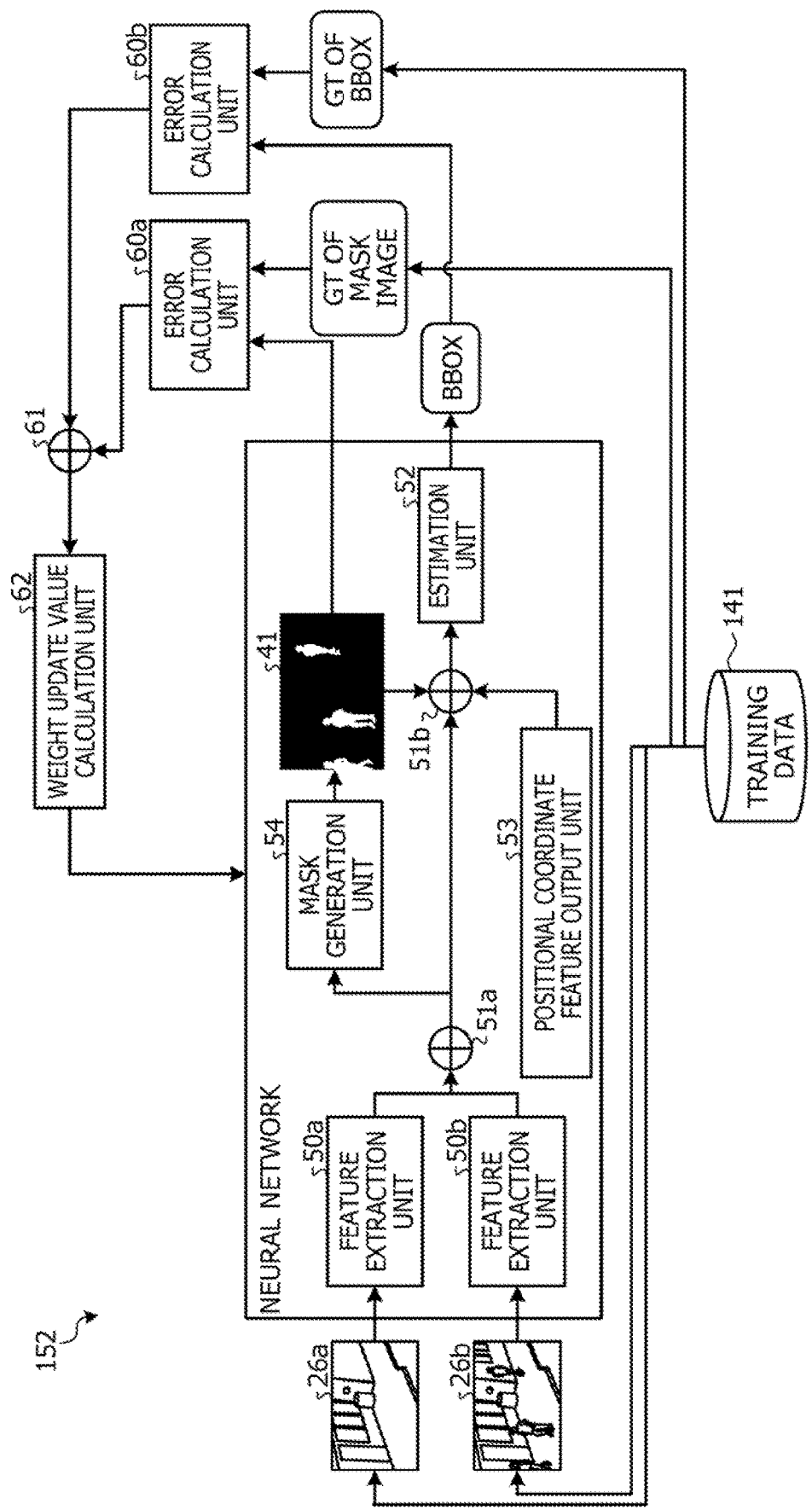
FIG. 8 is a diagram for explaining processing of a learning processing unit according to the first embodiment.

FIG. 8 is a diagram for explaining processing of the learning processing unit according to the first embodiment. For example, the learning processing unit 152 includes the feature extraction units 50a and 50b, combining units 51a and 52b, the estimation unit 52, the mask generation unit 54, and the positional coordinate feature output unit 53. Furthermore, the learning processing unit 152 includes error calculation units 60a and 60b, a combining unit 61, and a weight update value calculation unit 62. In the following descriptions, the feature extraction units 50a and 50b, the estimation unit 52, the positional coordinate feature output unit 53, and the mask generation unit 54 will be collectively referred to as a "neural network" as appropriate.

Processing of the feature extraction units 50a and 50b is similar to the explanation given with reference to FIG. 5. For example, the feature extraction units 50a and 50b read and execute the feature extraction model 143. The feature extraction units 50a and 50b input image data to the feature extraction model 143, and calculate an image feature on the basis of the parameters of the feature extraction model 143.

Explanation of the combining units 51a and 51b is similar to the explanation given with reference to FIG. 5.

Processing of the positional coordinate feature output unit 53 is similar to the explanation given with reference to FIG. 3.

Processing of the mask generation unit 54 is similar to the explanation given with reference to FIG. 5. For example, the mask generation unit 54 reads and executes the generation model 144. The mask generation unit 54 inputs, to the generation model 144, the feature obtained by combining the background image feature and the target image feature, and generates a mask image on the basis of the parameters of the generation model 144. The mask generation unit 54 outputs the mask image to the combining unit 51b and to the error calculation unit 60a.

Processing of the estimation unit 52 is similar to the explanation given with reference to FIG. 5. For example, the estimation unit 52 reads and executes the estimation model 145. The estimation unit 52 reads and executes the estimation model 145. The estimation unit 52 inputs combined information to the estimation model 145, and specifies the bbox of each object on the basis of the parameters of the estimation model 145. The estimation model 145 outputs the bbox to the error calculation unit 60b.

The learning processing unit 152 obtains background image data 26a for learning from the training data 141, and inputs it to the feature extraction unit 50a. The learning processing unit 152 obtains target image data 26b for learning from the training data 141, and inputs it to the feature extraction unit 50b. Furthermore, the learning processing unit 152 obtains GT of the mask image from the training data 141, and inputs it to the error calculation unit 60a. The learning processing unit 152 obtains GT of the bbox from the training data 141, and inputs it to the error calculation unit 60b.

The error calculation unit 60a calculates an error between the mask image 41 output from the mask generation unit 54 and the GT of the mask image of the training data 141. In the following descriptions, the error between the mask image 41 and the GT of the mask image will be referred to as a "first error". The error calculation unit 60a outputs the first error to the combining unit 61.

The error calculation unit 60b calculates an error between the bbox output from the estimation unit 52 and the GT of the bbox of the training data 141. In the following descriptions, the error between the bbox output from the estimation unit 52 and the GT of the bbox of the training data 141 will be referred to as a "second error". The error calculation unit 60b outputs the second error to the combining unit 61.

The combining unit 61 calculates the sum of the first error and the second error. In the following descriptions, the sum of the first error and the second error will be referred to as a "total error". The combining unit 61 outputs the total error to the weight update value calculation unit 62.

The weight update value calculation unit 62 updates the parameters (weights) of the neural network in such a manner that the total error reduces. For example, the weight update value calculation unit 62 updates the parameters of the feature extraction units 50a and 50b (feature extraction model 143), the mask generation unit 54 (generation model 144), and the estimation unit 52 (estimation model 145) using backpropagation or the like.

The learning processing unit 152 repeatedly executes the process described above using each input data and ground truth stored in the training data 141. The learning processing unit 152 registers, in the storage unit 140, the feature extraction model 143, the generation model 144, and the estimation model 145 having been subject to the machine learning.

The description returns to FIG. 6. The inference processing unit 153 specifies an area of an object not present in the background image data but present in the target image data using the feature extraction units 50a and 50b (feature extraction model 143), the mask generation unit 54 (generation model 144), and the estimation unit 52 (estimation model 145) having been subject to the machine learning.

Figure 9:
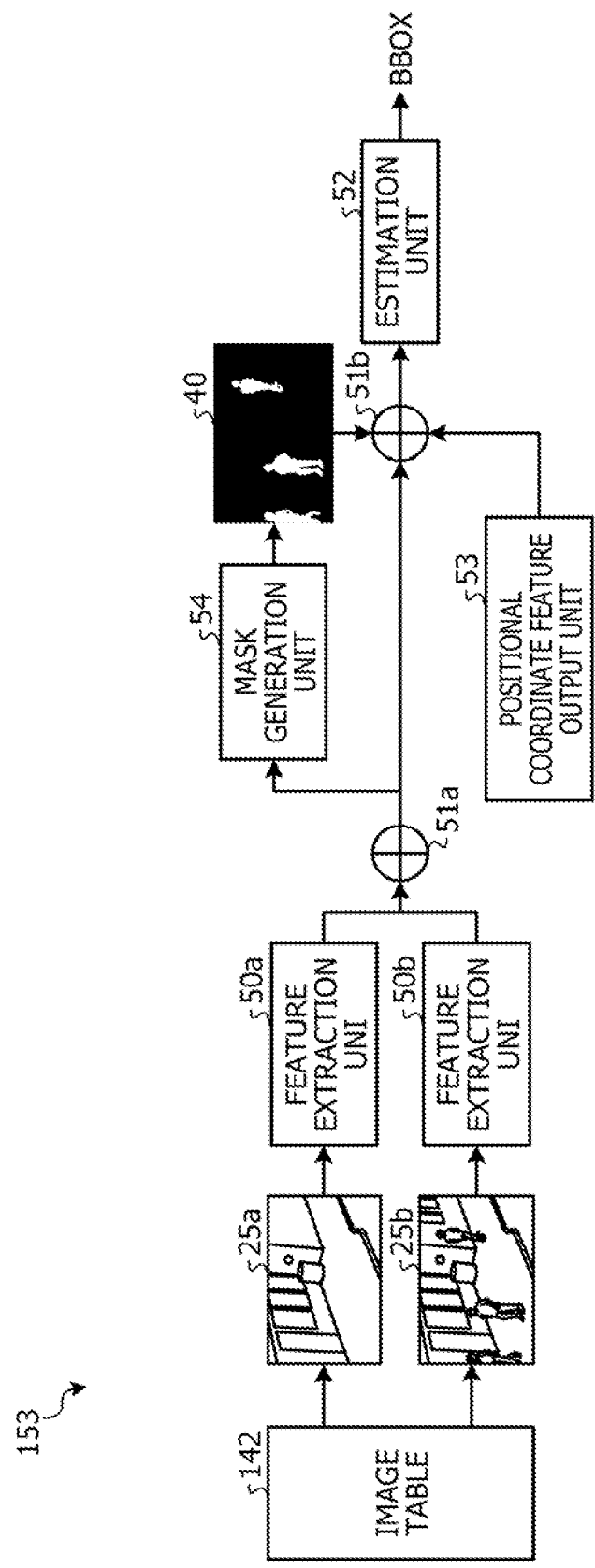
FIG. 9 is a diagram for explaining processing of an inference processing unit according to the first embodiment.

FIG. 9 is a diagram for explaining the processing of the inference processing unit according to the first embodiment. For example, the inference processing unit 153 includes the feature extraction units 50a and 50b, the combining units 51a and 52b, the estimation unit 52, the mask generation unit 54, and the positional coordinate feature output unit 53.

Processing of the feature extraction units 50a and 50b is similar to the explanation given with reference to FIG. 5. For example, the feature extraction units 50a and 50b reads and executes the feature extraction model 143 having been subject to the machine learning. The feature extraction units 50a and 50b input image data to the feature extraction model 143, and calculate an image feature on the basis of the parameters of the feature extraction model 143.

Explanation of the combining units 51a and 51b is similar to the explanation given with reference to FIG. 5.

Processing of the positional coordinate feature output unit 53 is similar to the explanation given with reference to FIG. 3.

Processing of the mask generation unit 54 is similar to the explanation given with reference to FIG. 5. For example, the mask generation unit 54 reads and executes the generation model 144 having been subject to the machine learning. The mask generation unit 54 inputs, to the generation model 144, the feature obtained by combining the background image feature and the target image feature, and generates a mask image on the basis of the parameters of the generation model 144. The mask generation unit 54 outputs the mask image to the combining unit 51b.

Processing of the estimation unit 52 is similar to the explanation given with reference to FIG. 5. For example, the estimation unit 52 reads and executes the learned estimation model 145. The estimation unit 52 reads and executes the estimation model 145. The estimation unit 52 inputs the combined information 45 to the estimation model 145, and specifies the bbox of each object on the basis of the parameters of the estimation model 145.

The inference processing unit 153 obtains the background image data 25a from the image table 142, and inputs it to the feature extraction unit 50a. The inference processing unit 153 obtains the target image data 25b from the image table 142, and inputs it to the feature extraction unit 50b. The inference processing unit 153 may output the information of the bbox specified by the estimation unit 52 to the display unit 130, or may output it to an external device.

Next, an exemplary processing procedure of the information processing apparatus 100 according to the first embodiment will be described. Hereinafter, a processing procedure of a learning process and a processing procedure of an inference process executed by the information processing apparatus 100 will be described in order.

Figure 10:
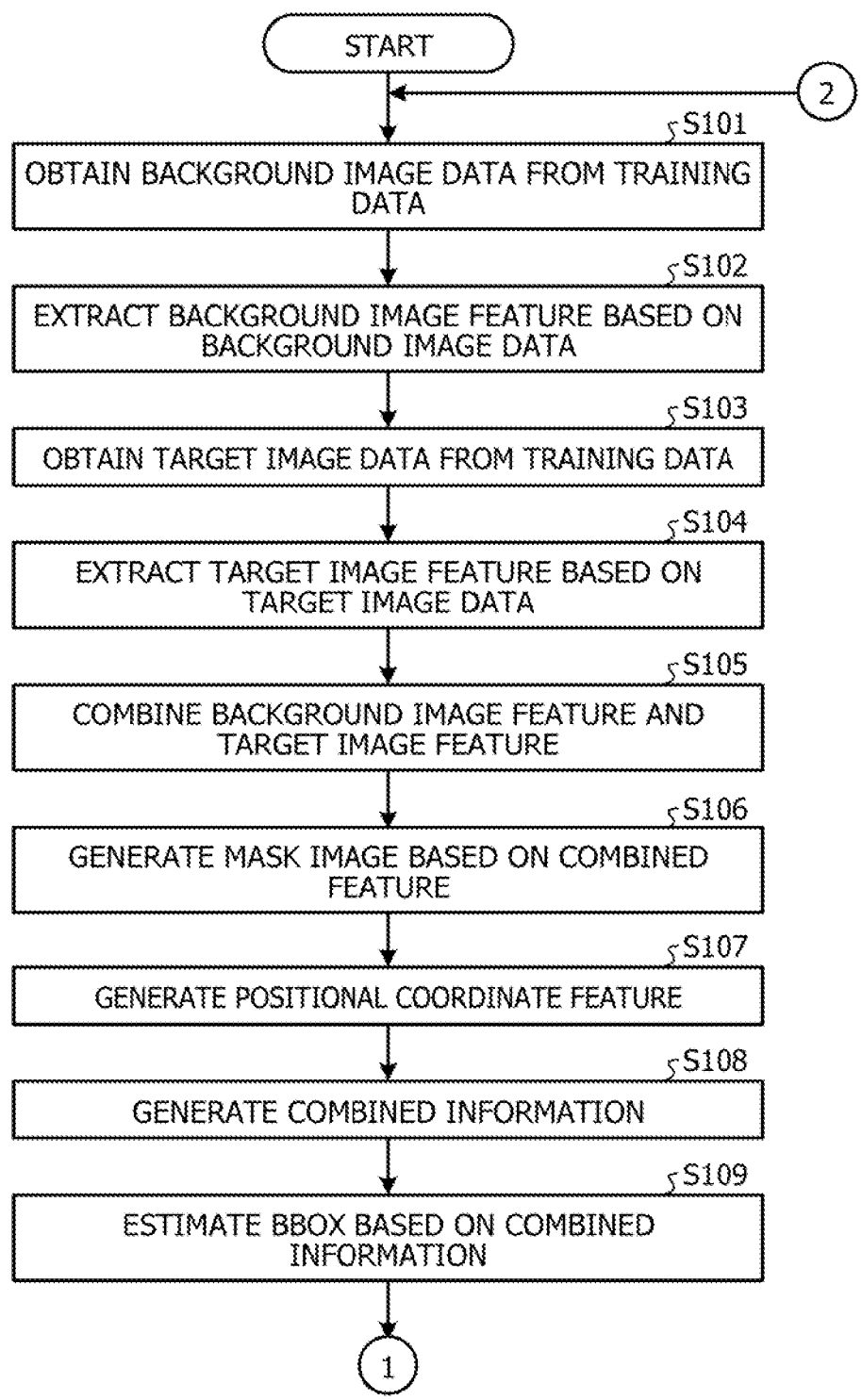
FIG. 10 is a flowchart (1) illustrating a processing procedure of a learning process according to the first embodiment.
Figure 11:
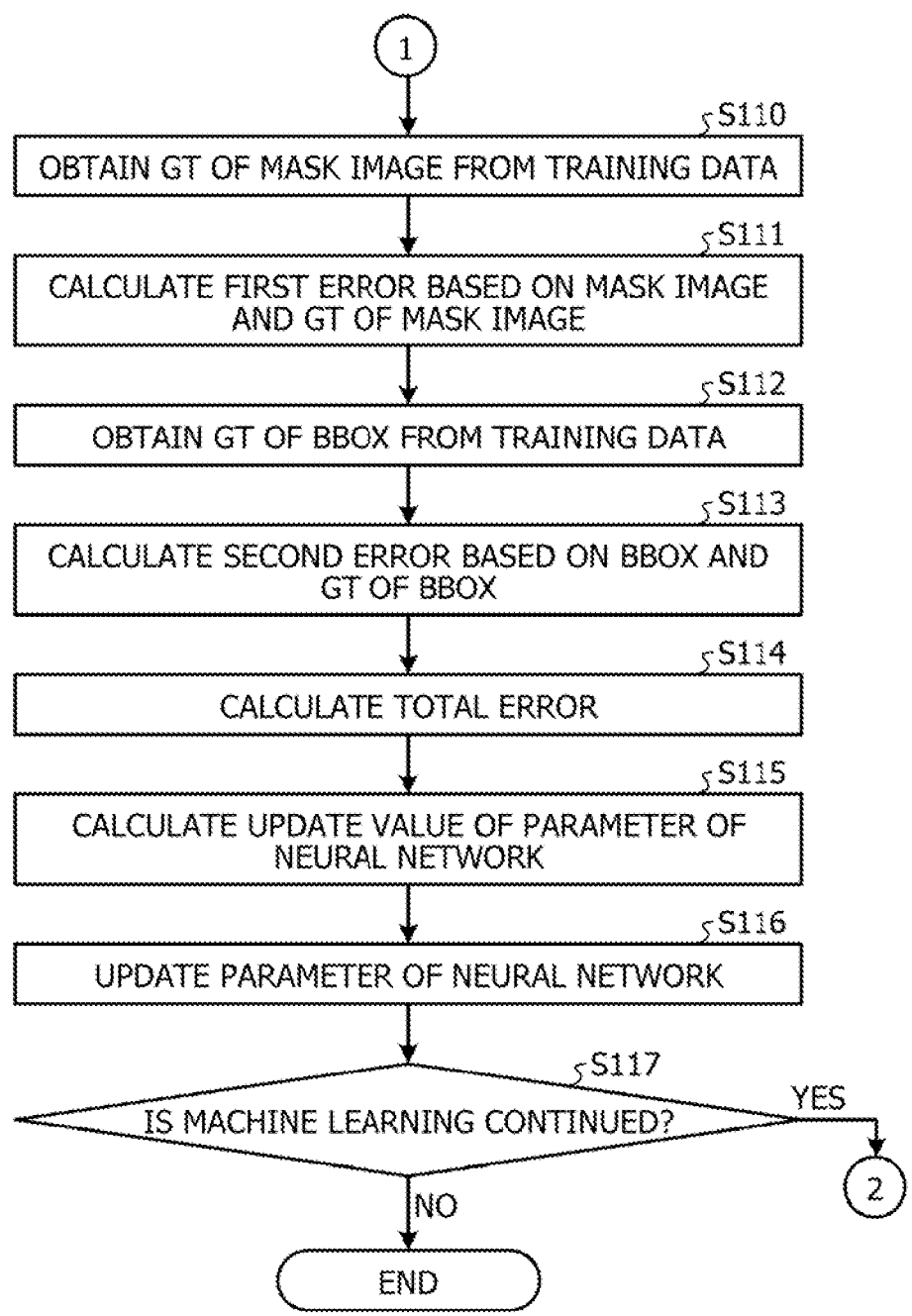
FIG. 11 is a flowchart (2) illustrating the processing procedure of the learning process according to the first embodiment.

The processing procedure of the learning process will be described. FIGS. 10 and 11 are flowcharts illustrating the processing procedure of the learning process according to the first embodiment. As illustrated in FIG. 10, the learning processing unit 152 of the information processing apparatus 100 obtains background image data from the training data 141 (step S101). The feature extraction unit 50a of the learning processing unit 152 extracts a background image feature on the basis of the background image data (step S102).

The learning processing unit 152 obtains target image data from the training data 141 (step S103). The feature extraction unit 50b of the learning processing unit 152 extracts a target image feature on the basis of the target image data (step S104).

The combining unit 51a of the learning processing unit 152 combines the background image feature and the target image feature (step S105). The mask generation unit 54 of the learning processing unit 152 generates a mask image on the basis of the combined feature (step S106).

The positional coordinate feature output unit 53 of the learning processing unit 152 generates a positional coordinate feature (step S107). The combining unit 51b of the learning processing unit 152 generates combined information in which individual features are combined (step S108).

The estimation unit 52 of the learning processing unit 152 estimates the bbox on the basis of the combined information (step S109). The learning processing unit 152 proceeds to step S110 in FIG. 11.

The description proceeds to FIG. 11. The learning processing unit 152 obtains the GT of the mask image from the training data 141 (step S110). The error calculation unit 60a of the learning processing unit 152 calculates a first error on the basis of the mask image and the GT of the mask image (step S111).

The learning processing unit 152 obtains the GT of the bbox from the training data 141 (step S112). The error calculation unit 60b calculates a second error on the basis of the bbox and the GT of the bbox (step S113).

The combining unit 61 of the learning processing unit 152 calculates a total error of the first error and the second error (step S114). The weight update value calculation unit 62 of the learning processing unit 152 calculates an update value of the parameter of the neural network (step S115). The learning processing unit 152 updates the parameter of the neural network (step S116).

If the machine learning is continued (Yes in step S117), the learning processing unit 152 proceeds to step S101 in FIG. 10. If the machine learning is not continued (No in step S117), the machine learning of the neural network is terminated.

Figure 12:
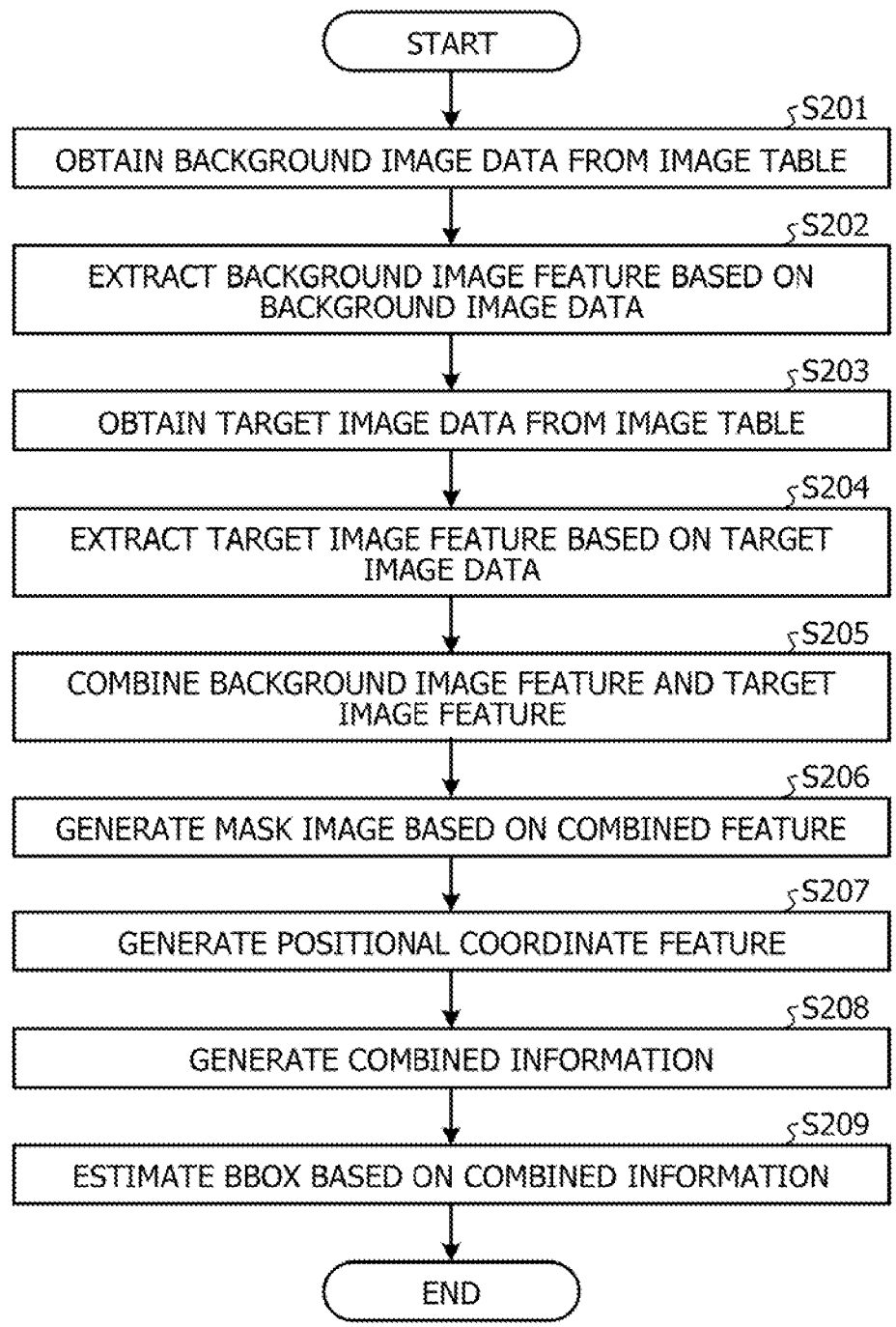
FIG. 12 is a flowchart illustrating a processing procedure of an inference process according to the first embodiment.

Next, the processing procedure of the inference process will be described. FIG. 12 is a flowchart illustrating the processing procedure of the inference process according to the first embodiment. As illustrated in FIG. 12, the inference processing unit 153 of the information processing apparatus 100 obtains background image data from the image table 142 (step S201). The feature extraction unit 50a of the inference processing unit 153 extracts a background image feature on the basis of the background image data (step S202).

The inference processing unit 153 obtains target image data from the image table 142 (step S203). The feature extraction unit 50b of the inference processing unit 153 extracts a target image feature on the basis of the target image data (step S204).

The combining unit 51a of the inference processing unit 153 combines the background image feature and the target image feature (step S205). The mask generation unit 54 of the inference processing unit 153 generates a mask image on the basis of the combined feature (step S206).

The positional coordinate feature output unit 53 of the inference processing unit 153 generates a positional coordinate feature (step S207). The combining unit 51b of the inference processing unit 153 generates combined information obtained by combining individual features (step S208).

The estimation unit 52 of the inference processing unit 153 estimates the bbox on the basis of the combined information (step S209).

Next, effects of the information processing apparatus 100 according to the first embodiment will be described. The information processing apparatus 100 inputs the background image data to the feature extraction unit 50a, and inputs the target image data to the feature extraction unit 50b, thereby extracting the background image feature and the target image feature. The information processing apparatus 100 inputs, to the mask generation unit 54, the feature obtained by combining the background image feature and the target image feature, and generates a mask image. The information processing apparatus 100 inputs the mask image and information obtained by combining the individual features to the estimation unit 52, thereby specifying the object area. As a result, it becomes possible to discriminate and detect each object even if the object included in the target image data is an unknown object that has not been learned in advance.

The information processing apparatus 100 inputs, to the estimation unit 52, information obtained by combining the background image feature, the target image feature, the mask image, and the coordinate feature, and specifies the object area. As a result, even if the target image data contains objects having the same appearance, it is possible to execute convolution processing in such a manner that the individual objects can be distinguished from each other.

The information processing apparatus 100 executes machine learning of the feature extraction units 50a and 50b, the mask generation unit 54, and the estimation unit 52 on the basis of the training data 141. As a result, even if the object contained in the target image data is an unknown object that has not been learned in advance, it is possible to carry out machine learning of the neural network in which each object can be discriminated and detected.

The information processing apparatus 100 inputs, to the estimation unit 52, information obtained by further combining the coordinate feature in addition to the individual features, and executes machine learning. As a result, even if the target image data contains objects having the same appearance, it is possible to carry out machine learning of the neural network while individual objects are distinguished from each other.

The information processing apparatus 100 inputs, to the estimation unit 52, the information obtained by further combining the mask image in addition to the individual features, and executes machine learning. As a result, an effect of limiting the object to be detected to the object area in the mask image may be expected.

Second Embodiment

A configuration of a system according to a second embodiment is similar to the system described in the first embodiment. It is assumed that an information processing apparatus according to the second embodiment is connected to a camera 10 via a network 11 in a similar manner to the first embodiment.

The information processing apparatus according to the second embodiment performs machine learning regarding feature extraction units 50a and 50b and an estimation unit 52, which are basic parts described with reference to FIG. 2. The information processing apparatus specifies each object using the feature extraction units 50a and 50b and the estimation unit 52 having been subject to the machine learning.

Figure 13:
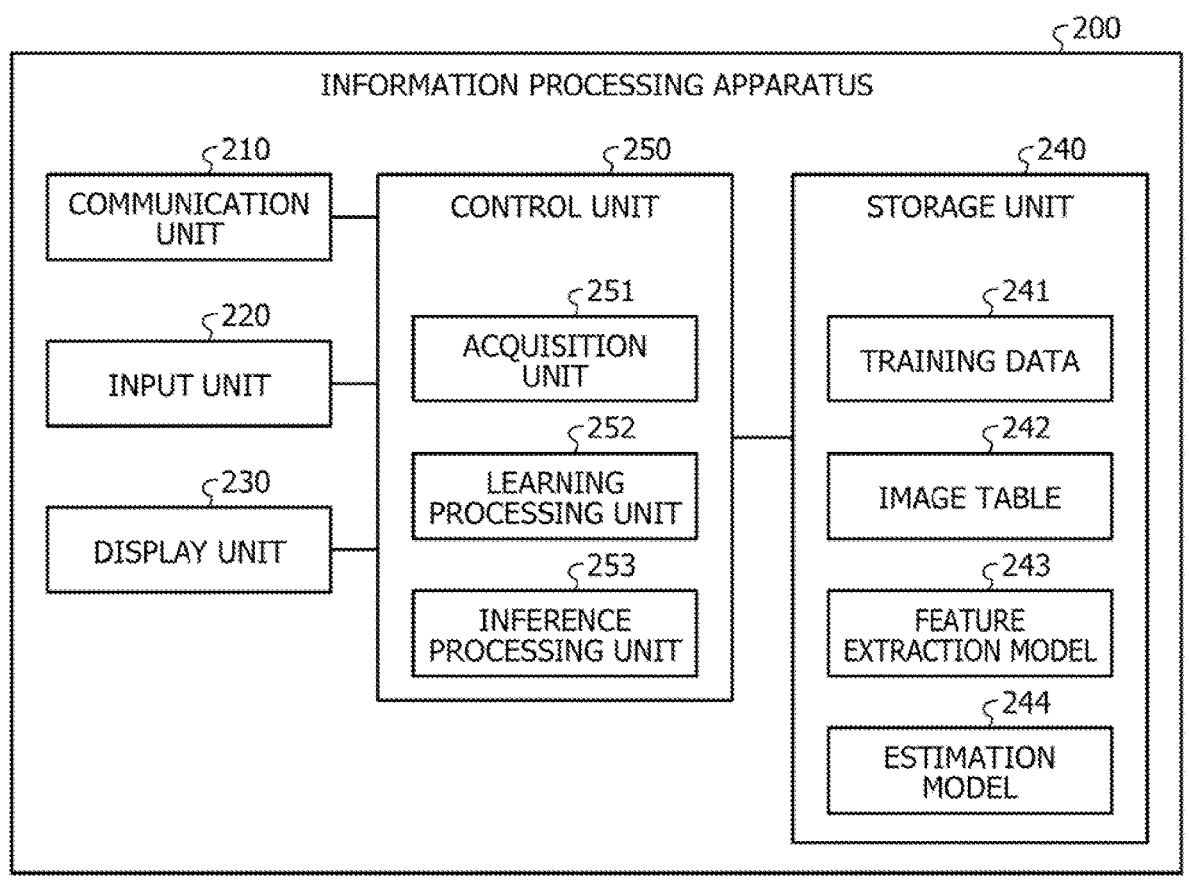
FIG. 13 is a functional block diagram illustrating a configuration of an information processing apparatus according to a second embodiment.

FIG. 13 is a functional block diagram illustrating a configuration of the information processing apparatus according to the second embodiment. As illustrated in FIG. 13, this information processing apparatus 200 includes a communication unit 210, an input unit 220, a display unit 230, a storage unit 240, and a control unit 250.

Descriptions regarding the communication unit 210, the input unit 220, and the display unit 230 are similar to the descriptions regarding the communication unit 110, the input unit 120, and the display unit 130 described in the first embodiment.

The storage unit 240 has training data 241, an image table 242, a feature extraction model 243, and an estimation model 244. The storage unit 240 corresponds to a semiconductor memory element such as a RAM, a flash memory, or the like, or a storage device such as an HDD or the like.

The training data 241 is data to be used at a time of executing machine learning. FIG. 14 is a diagram illustrating an exemplary data structure of the training data according to the second embodiment. As illustrated in FIG. 14, the training data 241 retains an item number, input data, and ground truth (GT) in association with each other. The input data includes the background image data for learning and the target image data for learning. The ground truth includes GT of a bbox (coordinates of object area).

The image table 242 is a table that retains the background image data and the target image data to be used at a time of inference.

The feature extraction model 243 is a machine learning model (CNN) to be executed by the feature extraction units 50a and 50b. When image data is input to the feature extraction model 243, an image feature is output.

The estimation model 244 is a machine learning model (CNN) to be executed by the estimation unit 52. When the background image feature and the target image feature are input to the estimation model 244, the bbox is output.

The control unit 250 includes an acquisition unit 251, a learning processing unit 252, and an inference processing unit 253. The control unit 250 corresponds to a CPU or the like.

In a case where the acquisition unit 251 obtains the training data 241 from an external device or the like, it registers the obtained training data 241 in the storage unit 240.

The acquisition unit 251 obtains the background image data from the camera 10 in advance, and registers it in the image table 242. The acquisition unit 251 obtains the target image data from the camera 10, and registers it in the image table 242.

The learning processing unit 252 executes machine learning of the feature extraction units 50a and 50b (feature extraction model 243) and the estimation unit 52 (estimation model 244) on the basis of the training data 241.

Figure 15:
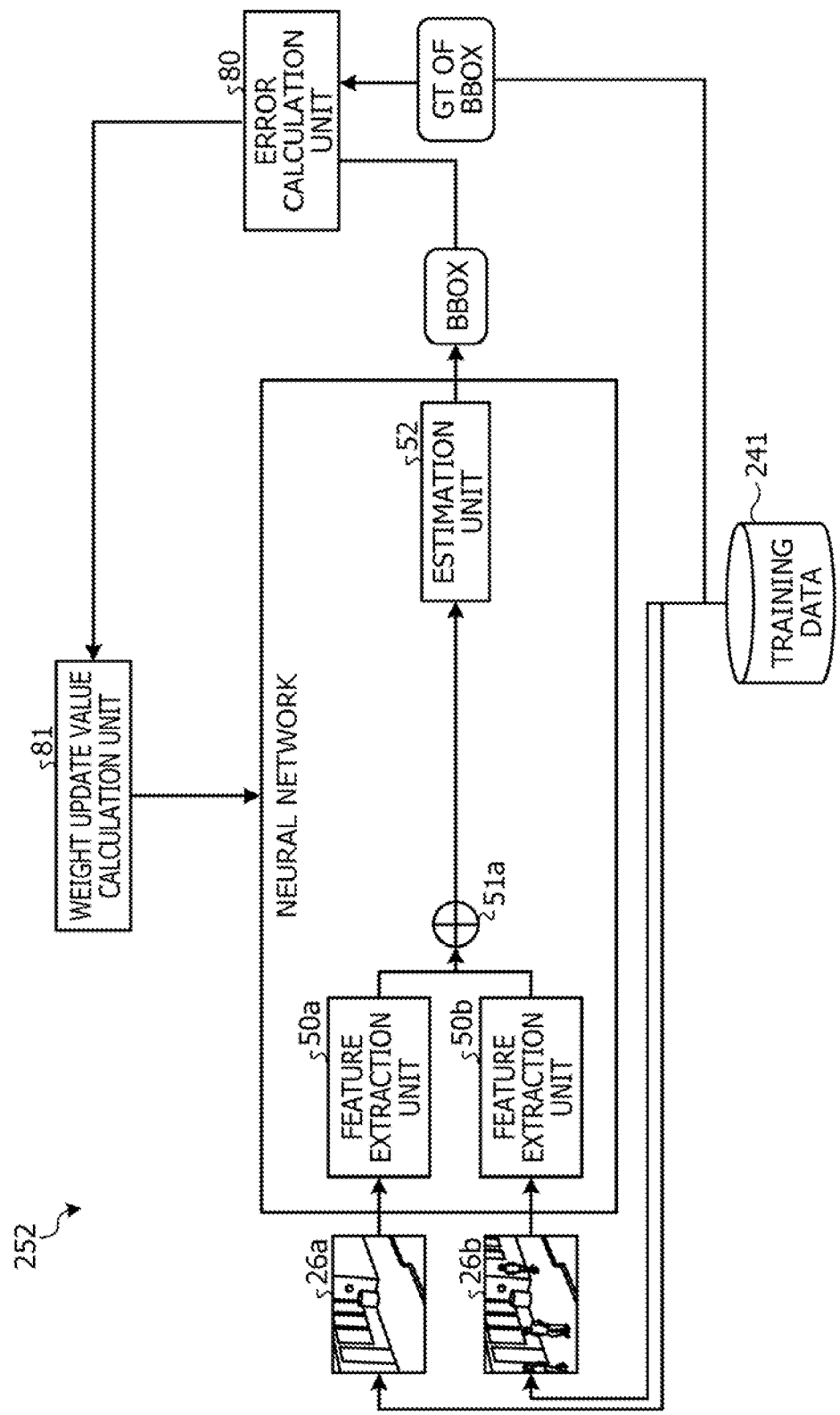
FIG. 15 is a diagram for explaining processing of a learning processing unit according to the second embodiment.

FIG. 15 is a diagram for explaining processing of the learning processing unit according to the second embodiment. For example, the learning processing unit 252 includes the feature extraction units 50a and 50b, a combining unit 51a, and the estimation unit 52. Furthermore, the learning processing unit 252 includes an error calculation unit 80 and a weight update value calculation unit 81. In the following descriptions, the feature extraction units 50a and 50b and the estimation unit 52 will be collectively referred to as a "neural network" as appropriate.

Processing of the feature extraction units 50a and 50b is similar to the explanation given with reference to FIG. 2. For example, the feature extraction units 50a and 50b read and execute the feature extraction model 143. The feature extraction units 50a and 50b input image data to the feature extraction model 243, and calculate an image feature on the basis of parameters of the feature extraction model 243.

The combining unit 51a combines the background image feature and the target image feature, and outputs the combined feature to the estimation unit 52.

The estimation unit 52 reads and executes the estimation model 244. The estimation unit 52 reads and executes the estimation model 244. The estimation unit 52 inputs the combined feature to the estimation model 244, and specifies the bbox of each object on the basis of parameters of the estimation model 244. The estimation model 244 outputs the bbox to the error calculation unit 80.

The learning processing unit 252 obtains background image data 26a for learning from the training data 241, and inputs it to the feature extraction unit 50a. The learning processing unit 252 obtains target image data 26b for learning from the training data 241, and inputs it to the feature extraction unit 50b. The learning processing unit 252 obtains GT of the bbox from the training data 241, and inputs it to the error calculation unit 80.

The error calculation unit 80 calculates an error between the bbox output from the estimation unit 52 and the GT of the bbox of the training data 241. The error calculation unit 80 outputs the calculated error to the weight update value calculation unit 81.

The weight update value calculation unit 81 updates parameters (weights) of the neural network in such a manner that the error reduces. For example, the weight update value calculation unit 81 updates the parameters of the feature extraction units 50a and 50b (feature extraction model 243) and the estimation unit 52 (estimation model 244) using backpropagation or the like.

The learning processing unit 252 repeatedly executes the process described above using each input data and ground truth stored in the training data 241. The learning processing unit 252 registers, in the storage unit 240, the feature extraction model 243 and the estimation model 244 having been subject to the machine learning.

The description returns to FIG. 13. The inference processing unit 253 specifies an area of an object not present in the background image data but present in the target image data using the feature extraction units 50a and 50b (feature extraction model 243) and the estimation unit 52 (estimation model 244) having been subject to the machine learning.

Figure 16:
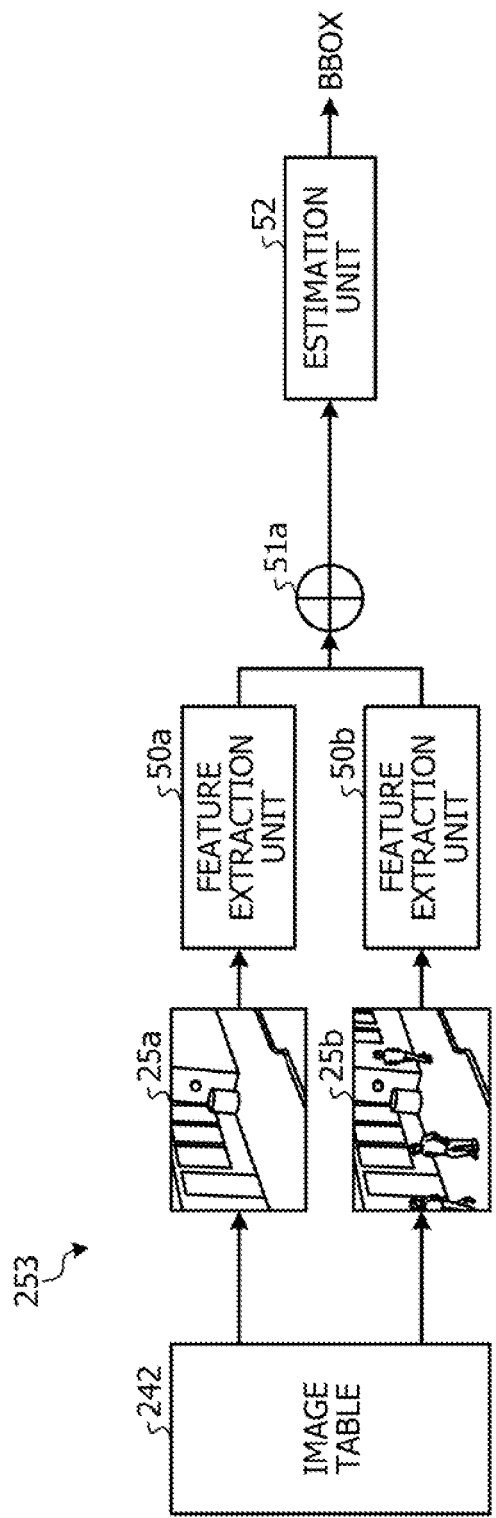
FIG. 16 is a diagram for explaining processing of an inference processing unit according to the second embodiment.

FIG. 16 is a diagram for explaining processing of the inference processing unit according to the second embodiment. For example, the inference processing unit 253 includes the feature extraction units 50a and 50b, the combining unit 51a, and the estimation unit 52.

Processing of the feature extraction units 50a and 50b is similar to the explanation given with reference to FIG. 2. For example, the feature extraction units 50a and 50b reads and executes the feature extraction model 243 having been subject to the machine learning. The feature extraction units 50a and 50b input image data to the feature extraction model 243, and calculate an image feature on the basis of parameters of the feature extraction model 243.

The combining unit 51a combines the background image feature and the target image feature, and outputs the combined feature to the estimation unit 52.

Processing of the estimation unit 52 is similar to the explanation given with reference to FIG. 2. For example, the estimation unit 52 reads and executes the learned estimation model 244. The estimation unit 52 reads and executes the estimation model 244. The estimation unit 52 inputs, to the estimation model 244, information obtained by combining the background image feature and the target image feature, and specifies the bbox of each object on the basis of the parameters of the estimation model 244.

The inference processing unit 253 obtains background image data 25*a* from the image table 242, and inputs it to the feature extraction unit 50*a*. The inference processing unit 253 obtains target image data 25*b* from the image table 242, and inputs it to the feature extraction unit 50*b*. The inference processing unit 253 may output the information of the bbox specified by the estimation unit 52 to the display unit 230, or may output it to an external device.

Next, an exemplary processing procedure of the information processing apparatus 200 according to the second embodiment will be described. Hereinafter, a processing procedure of a learning process and a processing procedure of an inference process executed by the information processing apparatus 200 will be described in order.

Figure 17:
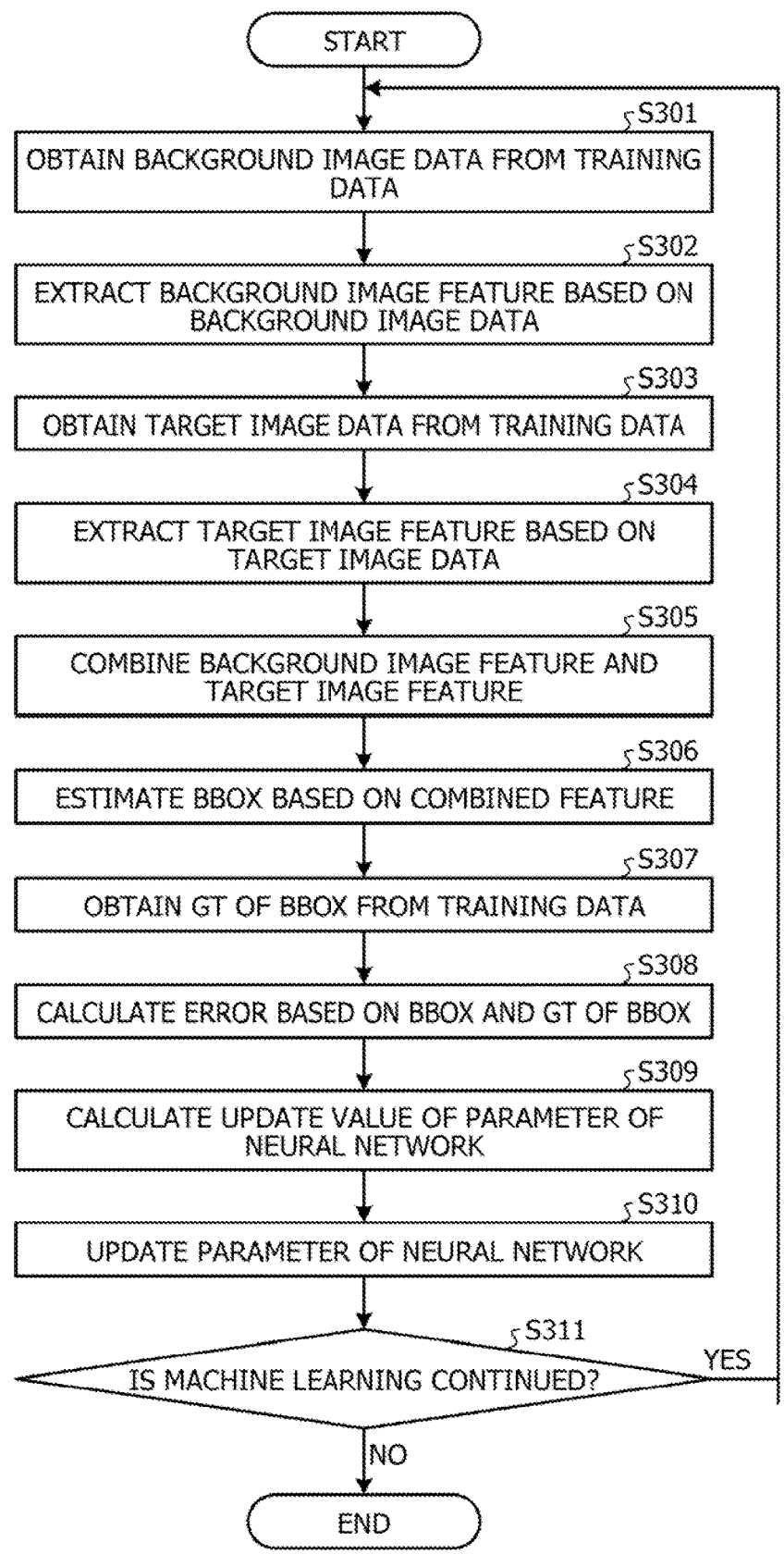
FIG. 17 is a flowchart illustrating a processing procedure of a learning process according to the second embodiment.

The processing procedure of the learning process will be described. FIG. 17 is a flowchart illustrating the processing procedure of the learning process according to the second embodiment. As illustrated in FIG. 17, the learning processing unit 252 of the information processing apparatus 200 obtains background image data from the training data 241 (step S301). The feature extraction unit 50*a* of the learning processing unit 252 extracts a background image feature on the basis of the background image data (step S302).

The learning processing unit 252 obtains target image data from the training data 241 (step S303). The feature extraction unit 50*b* of the learning processing unit 252 extracts a target image feature on the basis of the target image data (step S304).

The combining unit 51*a* of the learning processing unit 252 combines the background image feature and the target image feature (step S305). The estimation unit 52 of the learning processing unit 252 estimates the bbox on the basis of the combined feature (step S306).

The learning processing unit 252 obtains the GT of the bbox from the training data 241 (step S307). The error calculation unit 80 calculates an error on the basis of the bbox and the GT of the bbox (step S308).

The weight update value calculation unit 81 of the learning processing unit 252 calculates an update value of the parameter of the neural network (step S309). The learning processing unit 252 updates the parameter of the neural network (step S310).

If the machine learning is continued (Yes in step S311), the learning processing unit 252 proceeds to step S301. If the machine learning is not continued (No in step S311), the machine learning of the neural network is terminated.

Figure 18:
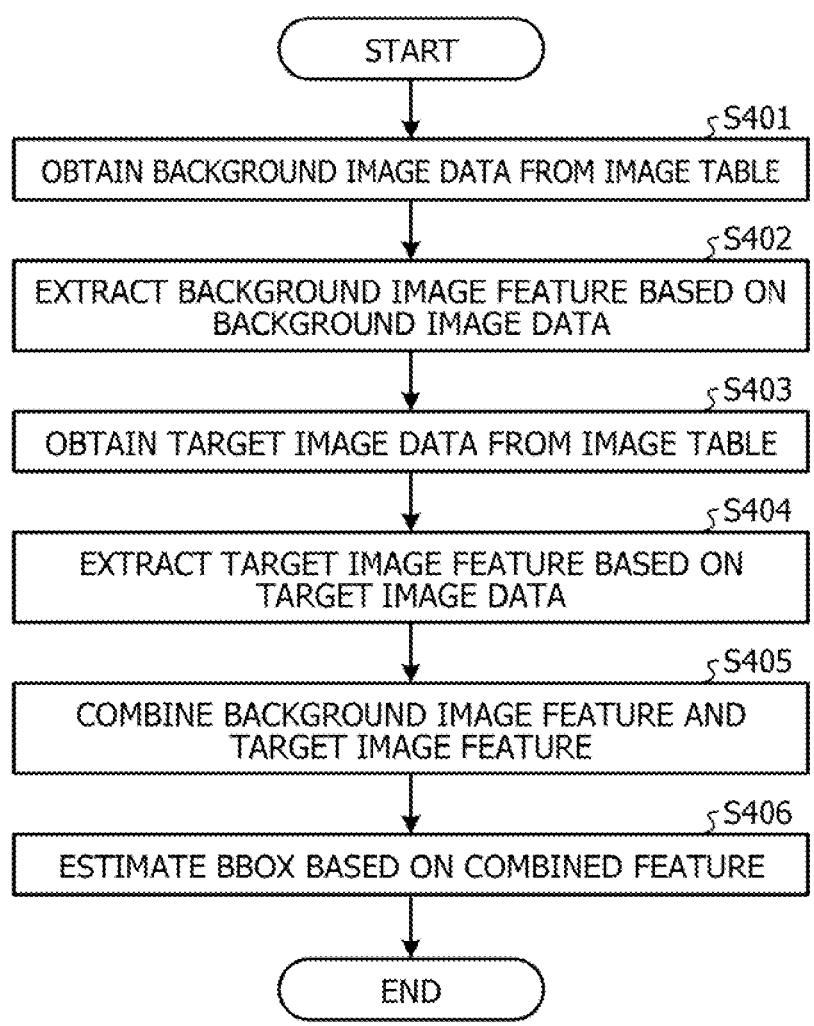
FIG. 18 is a flowchart illustrating a processing procedure of an inference process according to the second embodiment.

Next, the processing procedure of the inference process will be described. FIG. 18 is a flowchart illustrating the processing procedure of the inference process according to the second embodiment. As illustrated in FIG. 18, the inference processing unit 253 of the information processing apparatus 200 obtains background image data from the image table 242 (step S401). The feature extraction unit 50*a* of the inference processing unit 253 extracts a background image feature on the basis of the background image data (step S402).

The inference processing unit 253 obtains target image data from the image table 242 (step S403). The feature extraction unit 50*b* of the inference processing unit 253 extracts a target image feature on the basis of the target image data (step S404).

The combining unit 51*a* of the inference processing unit 253 combines the background image feature and the target image feature (step S405).

The estimation unit 52 of the inference processing unit 253 estimates the bbox on the basis of the combined feature (step S406).

Next, effects of the information processing apparatus 200 according to the second embodiment will be described. The information processing apparatus 200 inputs the background image data to the feature extraction unit 50*a*, and inputs the target image data to the feature extraction unit 50*b*, thereby extracting the background image feature and the target image feature. The information processing apparatus 200 inputs, to the estimation unit 52, the feature obtained by combining the background image feature and the target image feature, thereby specifying the object area. As a result, it becomes possible to discriminate and detect each object even if the object included in the target image data is an unknown object that has not been learned in advance.

Third Embodiment

Figure 19:
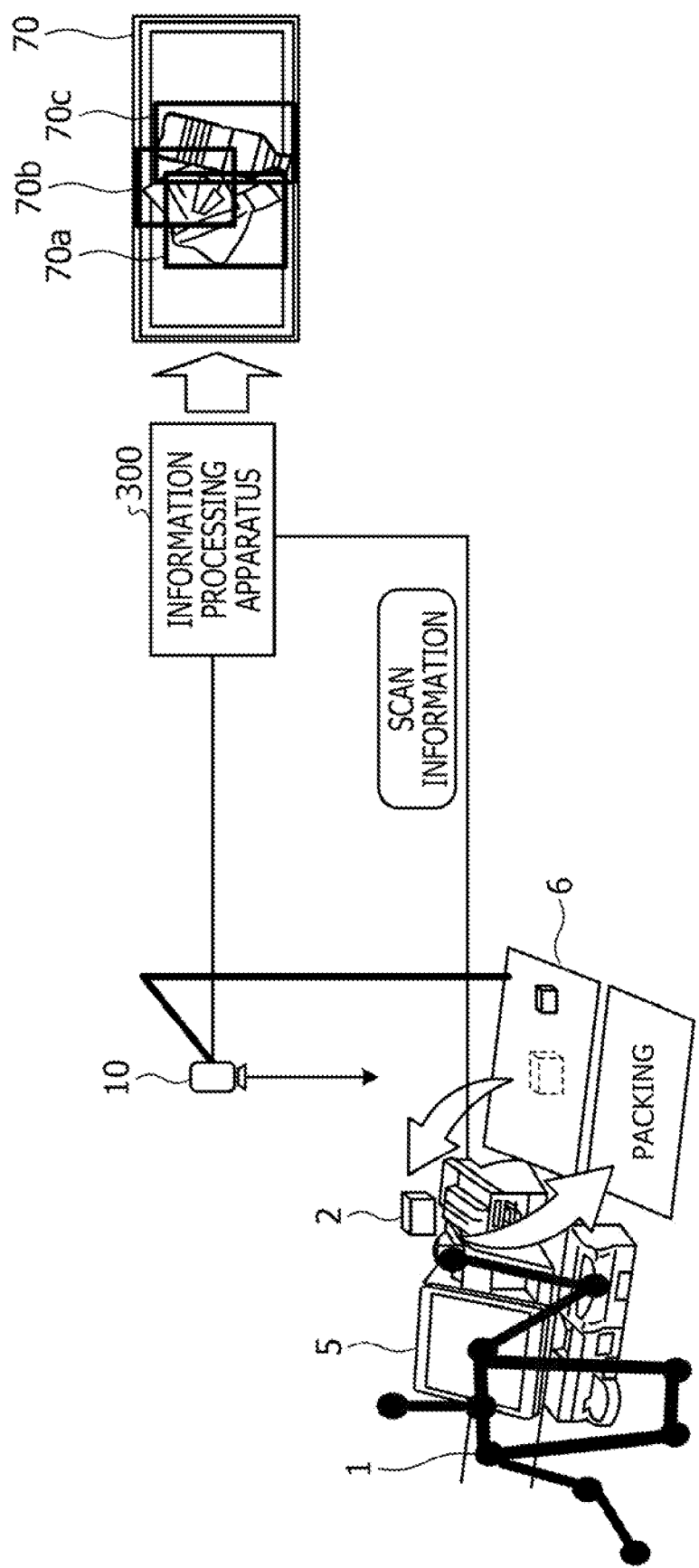
FIG. 19 is a diagram illustrating a system according to a third embodiment.

Next, an exemplary system according to a third embodiment will be described. FIG. 19 is a diagram illustrating a system according to the third embodiment. As illustrated in FIG. 19, this system includes a self-checkout machine 5, a camera 10, and an information processing apparatus 300. The self-checkout machine 5, the camera 10, and the information processing apparatus 300 are connected by wire or wirelessly.

It is assumed that a user 1 picks up a product 2 placed on a temporary table 6, performs an operation of scanning the barcode of the product 2 on the self-checkout machine 5, and do packing.

The self-checkout machine 5 is a point-of-sale (POS) checkout system in which the user 1 who purchases the product reads the barcode of the product and makes payment. For example, when the user 1 moves the product to be purchased to the scan area of the self-checkout machine 5, the self-checkout machine 5 scans the barcode of the product. When the scanning operation by the user 1 is complete, the self-checkout machine 5 notifies the information processing apparatus 300 of information regarding the number of scanned products. In the following descriptions, the information regarding the number of scanned products will be referred to as "scan information".

The camera 10 is a camera that images the temporary table 6 of the self-checkout machine 5. The camera 10 transmits image data in an imaging range to the information processing apparatus 300. It is assumed that the camera 10 transmits image data (background image data) of the temporary table 6 on which no product is placed to the information processing apparatus 300 in advance. When a product to be purchased is placed on the temporary table 6, the camera 10 transmits image data (target image data) of the temporary table 6 to the information processing apparatus 300.

The information processing apparatus 300 performs machine learning of the neural network in a similar manner to the information processing apparatus 100 described in the first embodiment. The neural network includes feature extraction units 50*a* and 50*b*, combining units 51*a* and 51*b*, an estimation unit 52, a positional coordinate feature output unit 53, and a mask generation unit 54.

The information processing apparatus 300 inputs the background image data and the target image data to the neural network having been subject to the machine learning, thereby specifying each object included in the target image data. The information processing apparatus 300 counts the specified objects to specify the number of products. The information processing apparatus 300 detects an omission of scanning when the specified number of products does not match the number of products included in the scan information.

For example, the information processing apparatus 300 uses a result of inputting the background image data and the target image data to the neural network as an output result 70. Since the output result 70 includes three pieces of bbox of bbox 70a, 70b, and 70c, the information processing apparatus 300 specifies the number of products as "3". The information processing apparatus 300 detects an omission of scanning when the number of products included in the scan information is less than "3". The information processing apparatus 300 may notify a management server or the like (not illustrated) of the omission of scanning.

As described above, with the information processing apparatus 100 (200) described in the first and second embodiments applied to the system illustrated in FIG. 19, it becomes possible to detect fraud by the user, such as not reading the barcode.

Figure 20:
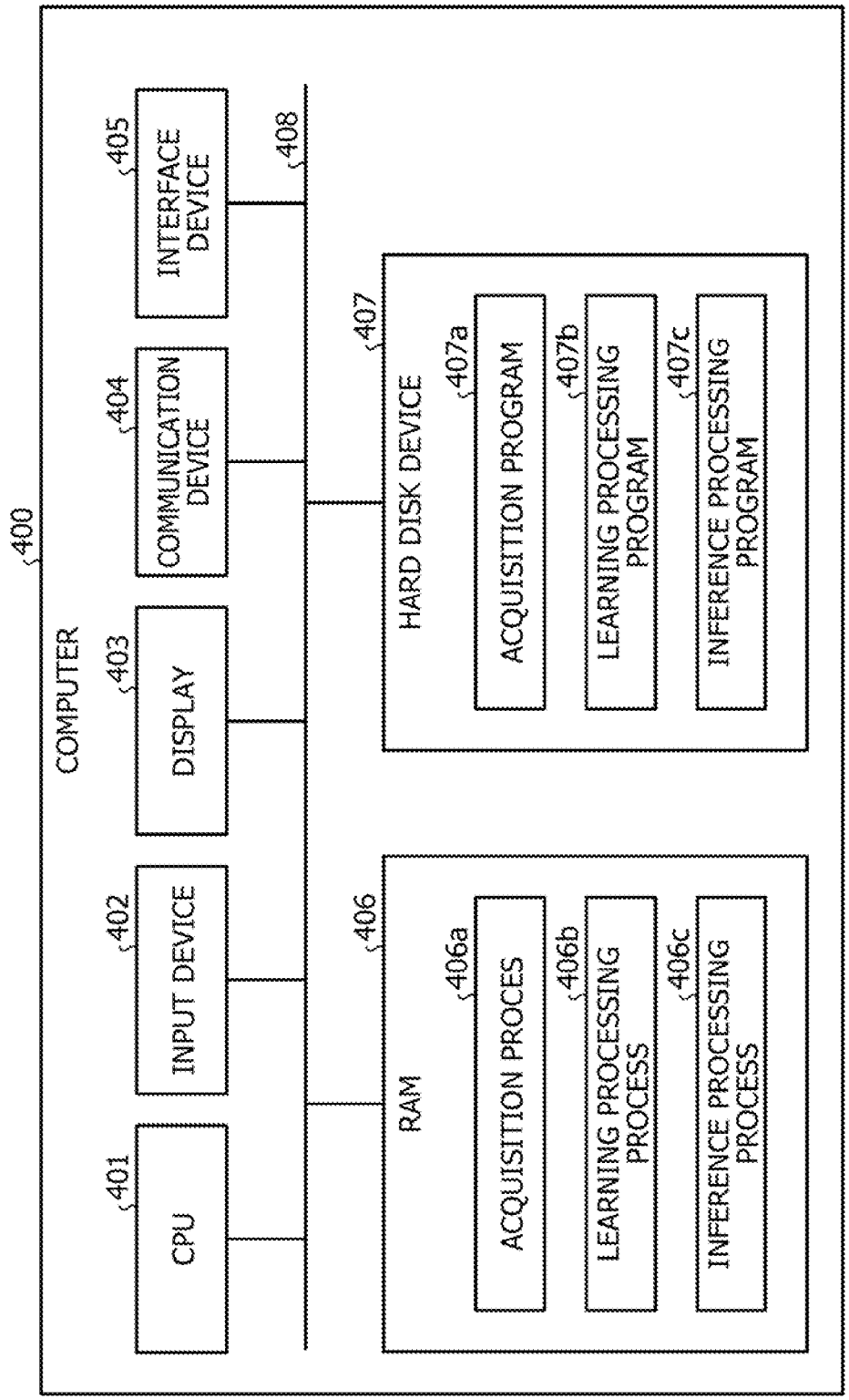
FIG. 20 is a diagram illustrating an exemplary hardware configuration of a computer that implements functions similar to those of the information processing apparatus.

Next, an exemplary hardware configuration of a computer that implements functions similar to those of the information processing apparatus 100 (200, 300) described in the embodiments above will be described. FIG. 20 is a diagram illustrating an exemplary hardware configuration of the computer that implements functions similar to those of the information processing apparatus.

As illustrated in FIG. 20, a computer 400 includes a CPU 401 that executes various types of arithmetic processing, an input device 402 that receives data input from a user, and a display 403. Furthermore, the computer 400 includes a communication device 404 that receives distance image data from the camera 10, and an interface device 405 connected to various devices. The computer 400 includes a RAM 406 that temporarily stores various types of information, and a hard disk device 407. Additionally, each of the devices 401 to 407 is connected to a bus 408.

The hard disk device 407 has an acquisition program 407a, a learning processing program 407b, and an inference processing program 407c. The CPU 401 reads the acquisition program 407a, the learning processing program 407b, and the inference processing program 407c, and loads them in the RAM 406.

The acquisition program 407a functions as an acquisition process 406a. The learning processing program 407b functions as a learning processing process 406b. The inference processing program 407c functions as an inference processing process 406c.

Processing of the acquisition process 406a corresponds to the processing of acquisition units 151 and 251. Processing of the learning processing process 406b corresponds to the processing of the learning processing units 152 and 252. Processing of the inference processing process 406c corresponds to the processing of the inference processing units 153 and 253.

Note that each of the programs 407a to 407c is not necessarily stored in the hard disk device 407 beforehand. For example, each of the programs may be stored in a "portable physical medium" such as a flexible disk (FD), a compact disc read only memory (CD-ROM), a digital versatile disk (DVD), a magneto-optical disk, an integrated circuit (IC) card, or the like to be inserted into the computer 400. Then, the computer 400 may read each of the programs 407a to 407c to execute it.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a program for causing a computer to execute a learning process comprising:
    obtaining training data, based on a background image in which an area before an object is arranged is imaged and a target image in which the area after the object is arranged is imaged which are input data, which uses information associated with the object as ground truth;
    executing a feature extraction convolutional neural network (CNN) which extracts a background image feature of the background image and a target image feature of the target image based on the training data;
    generating a mask image indicating an area different from a background based on combined information feature obtained by combining the background image feature and the target image feature;
    executing an estimation convolutional neural network which outputs area information indicating an area surrounding the object based on the combined information;
    obtaining the ground truth of the mask image from the training data;
    calculating a first error between the mask image and the ground truth of the mask image;
    obtaining the ground truth of the area information from the training data;
    calculating a second error between the area information and the ground truth of the area information;
    calculating a total error of the first error and the second error;
    calculating an update value of a parameter of a neural network convolutional neural network including the feature extraction convolutional neural network and the estimation convolutional neural network in such a manner that the total error reduces; and
    executing machine learning for the estimation convolutional neural network and the feature extraction convolutional neural network when the background image and the target image are input to the feature extraction convolutional neural network on a basis of the training data and the ground truth.

2. The non-transitory computer-readable recording medium according to claim 1, wherein the estimation convolutional neural network outputs the area information in a case where intermediate feature including the background image feature and the target image feature, the mask image, and a coordinate feature in which a coordinate value is arranged in an image plane are input.

3. A learning method comprising:
    obtaining, by a computer, training data, based on a background image in which an area before an object is arranged is imaged and a target image in which the area after the object is arranged is imaged which are as input data, which uses information associated with the object as ground truth;
    executing a feature extraction convolutional neural network (CNN) which extracts a background image feature of the background image and a target image feature of the target image based on the training data;

generating a mask image indicating an area different from a background based on combined information feature obtained by combining the background image feature and the target image feature;

executing an estimation convolutional neural network which outputs area information indicating an area surrounding the object based on the combined information;

obtaining the ground truth of the mask image from the training data;

calculating a first error between the mask image and the ground truth of the mask image;

obtaining the ground truth of the area information from the training data;

calculating a second error between the area information and the ground truth of the area information;

calculating a total error of the first error and the second error;

calculating an update value of a parameter of a convolutional neural network including the feature extraction convolutional neural network and the estimation convolutional neural network in such a manner that the total error reduces; and executing machine learning for the estimation convolutional neural network and the feature extraction convolutional neural network when the background image and the target image are input to the feature extraction convolutional neural network on a basis of the training data and the ground truth.

4. The learning method according to claim 3, wherein the estimation convolutional neural network outputs the area information in a case where the intermediate feature including the background image feature and the target image feature, the mask image, and a coordinate feature in which a coordinate value is arranged in an image plane are input.

5. An information processing apparatus comprising:
a memory; and
a processor coupled to the memory and configured to:
obtain training data, based on a background image in which an area before—an object is arranged is imaged and a target image in which the area after the object is arranged is imaged which are input data, which uses information associated with the object as ground truth;

execute a feature extraction convolutional neural network (CNN) which extracts a background image feature of the background image and a target image feature of the target image based on the training data;

generate a mask image indicating an area different from a background based on combined information feature obtained by combining the background image feature and the target image feature;

execute an estimation convolutional neural network which outputs area information indicating an area surrounding the object based on the combined information;

obtain the ground truth of the mask image from the training data;

calculate a first error between the mask image and the ground truth of the mask image;

obtain the ground truth of the area information from the training data;

calculate a second error between the area information and the ground truth of the area information;

calculate a total error of the first error and the second error;

calculate an update value of a parameter of a convolutional neural network including the feature extraction convolutional neural network and the estimation convolutional neural network in such a manner that the total error reduces; and executing machine learning for the estimation convolutional neural network and the feature extraction convolutional neural network when the background image and the target image are input to the feature extraction convolutional neural network on a basis of the training data and the ground truth.

6. The information processing apparatus according to claim 5, wherein the estimation convolutional neural network outputs the area information in a case where the intermediate feature including the background image feature and the target image feature, the mask image, and a coordinate feature in which a coordinate value is arranged in an image plane are input.

* * * * *